US012675635B1

(12) United States Patent
Teig et al.

(10) Patent No.: US 12,675,635 B1
(45) Date of Patent: Jul. 7, 2026

(54) TRAINING NATURAL LANGUAGE PROCESSING NETWORK BASED ON EXISTING NETWORK

(71) Applicant: Amazon Technologies, Inc., Seattle, WA (US)

(72) Inventors: Steven L. Teig, Menlo Park, CA (US); Eric A. Sather, Palo Alto, CA (US); Evgeny Sorkin, Vancouver (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 186 days.

(21) Appl. No.: 18/402,135

(22) Filed: Jan. 2, 2024

Related U.S. Application Data

(60) Provisional application No. 63/464,334, filed on May 5, 2023, provisional application No. 63/438,630, filed
(Continued)

(51) Int. Cl.
*G06F 40/284* (2020.01)
*G06F 40/00* (2020.01)
(Continued)

(52) U.S. Cl.
CPC ............ *G06F 40/284* (2020.01); *G06F 40/00* (2020.01); *G06F 40/10* (2020.01); *G06F 40/20* (2020.01);
(Continued)

(58) Field of Classification Search
CPC ........ G06F 40/284; G06F 40/00; G06F 40/10; G06F 40/20; G06F 40/279; G06N 3/02;
(Continued)

(56) References Cited

U.S. PATENT DOCUMENTS 4,866,634 A    9/1989   Reboh et al.
5,255,347 A   10/1993   Matsuba et al.
(Continued)

FOREIGN PATENT DOCUMENTS

CN    111062489 A   *   4/2020   ............. G06N 20/00
CN    112183670 A   *   1/2021   ........... G06F 18/214

OTHER PUBLICATIONS

Chen, Minghua, et al., "Markov Approximation for Combinatorial Network Optimization," IEEE Transactions on Information Theory, Oct. 2013, 27 pages, vol. 59, No. 10, IEEE.
(Continued)

*Primary Examiner* — Linda Wong
(74) *Attorney, Agent, or Firm* — K&L Gates LLP

(57) ABSTRACT

Some embodiments provide a method for training a first NLP network based on a previously-trained second NLP network. The method propagates text inputs through the first network to generate a first set of output vectors and the second network to generate a second set of output vectors. Each first-set vector generated based on a text input has a corresponding second-set vector generated based on the same text input and each vector of the first and second sets has a same number of vector components. The method computes a value for a loss function that emphasizes a maximum disparity between components of first-set vectors and corresponding components of second-set vectors. The method trains the first network using the computed loss function value to minimize the maximum disparity between the first-set vector components and corresponding second-set vector components so that the first network produces outputs similar to outputs of the second network.

19 Claims, 13 Drawing Sheets

Related U.S. Application Data on Jan. 12, 2023, provisional application No. 63/437,098, filed on Jan. 4, 2023.

(51) Int. Cl.

| | |
|---|---|
| *G06F 40/10* | (2020.01) |
| *G06F 40/20* | (2020.01) |
| *G06F 40/279* | (2020.01) |
| *G06N 3/02* | (2006.01) |
| *G06N 3/045* | (2023.01) |
| *G06N 3/0455* | (2023.01) |
| *G06N 3/08* | (2023.01) |
| *G06N 3/096* | (2023.01) |
| *G06N 20/00* | (2019.01) |

(52) U.S. Cl.
CPC ............. *G06F 40/279* (2020.01); *G06N 3/02* (2013.01); *G06N 3/045* (2023.01); *G06N 3/0455* (2023.01); *G06N 3/08* (2013.01); *G06N 3/096* (2023.01); *G06N 20/00* (2019.01)

(58) Field of Classification Search
CPC ........ G06N 3/045; G06N 3/0455; G06N 3/08; G06N 3/096; G06N 20/00
See application file for complete search history.

(56) References Cited

U.S. PATENT DOCUMENTS

| | | |
|---|---|---|
| 5,579,436 A | 11/1996 | Chou et al. |
| 6,601,052 B1 | 7/2003 | Lee et al. |
| 6,985,781 B2 | 1/2006 | Keeler et al. |
| 7,333,923 B1 | 2/2008 | Yamanishi et al. |
| 8,000,538 B2 | 8/2011 | Sarkar |
| 8,145,662 B2 | 3/2012 | Chen et al. |
| 9,373,087 B2 | 6/2016 | Nowozin |
| 10,019,654 B1 | 7/2018 | Pisoni |
| 10,586,151 B1 | 3/2020 | Teig |
| 11,475,310 B1 | 10/2022 | Teig et al. |
| 2003/0033263 A1 | 2/2003 | Cleary |
| 2004/0243954 A1 | 12/2004 | Devgan et al. |
| 2006/0010093 A1 | 1/2006 | Fan et al. |
| 2007/0078630 A1 | 4/2007 | Filatov et al. |
| 2007/0239642 A1 | 10/2007 | Sindhwani et al. |
| 2007/0271287 A1 | 11/2007 | Acharya et al. |
| 2008/0256011 A1 | 10/2008 | Rice |
| 2009/0106173 A1 | 4/2009 | Andrew et al. |
| 2010/0082639 A1 | 4/2010 | Li et al. |
| 2011/0105346 A1 | 5/2011 | Beattie et al. |
| 2011/0120718 A1 | 5/2011 | Craig |
| 2011/0182345 A1 | 7/2011 | Lei et al. |
| 2012/0271791 A1 | 10/2012 | Laan et al. |
| 2012/0283992 A1 | 11/2012 | Ji et al. |
| 2012/0331025 A1 | 12/2012 | Gemulla et al. |
| 2013/0257873 A1 | 10/2013 | Isozaki |
| 2014/0124265 A1 | 5/2014 | Al-Yami et al. |
| 2014/0207837 A1 | 7/2014 | Taniguchi et al. |
| 2014/0222747 A1 | 8/2014 | Zhou et al. |
| 2015/0100530 A1 | 4/2015 | Winih et al. |
| 2015/0161995 A1 | 6/2015 | Sainath et al. |
| 2015/0262083 A1 | 9/2015 | Xu et al. |
| 2016/0132786 A1 | 5/2016 | Balan et al. |
| 2016/0260222 A1 | 9/2016 | Paglieroni et al. |
| 2017/0061326 A1 | 3/2017 | Talathi et al. |
| 2017/0068844 A1 | 3/2017 | Friedland |
| 2017/0091615 A1 | 3/2017 | Liu et al. |
| 2017/0140298 A1 | 5/2017 | Wabnig et al. |
| 2017/0154425 A1 | 6/2017 | Pierce et al. |
| 2017/0161640 A1 | 6/2017 | Shamir |
| 2017/0183836 A1 | 6/2017 | Ahmed et al. |
| 2017/0262735 A1 | 9/2017 | Sanchez et al. |
| 2018/0033024 A1 | 2/2018 | Latapie et al. |
| 2018/0068221 A1 | 3/2018 | Brennan et al. |
| 2018/0101783 A1 | 4/2018 | Savkli |
| 2018/0174041 A1 | 6/2018 | Imam et al. |
| 2018/0219888 A1 | 8/2018 | Apostolopoulos |
| 2018/0336465 A1 | 11/2018 | Kim et al. |
| 2019/0005358 A1 | 1/2019 | Pisoni |
| 2019/0230913 A1 | 8/2019 | Chen et al. |
| 2019/0286970 A1 | 9/2019 | Karaletsos et al. |
| 2020/0007934 A1 | 1/2020 | Ortiz et al. |
| 2020/0202218 A1 | 6/2020 | Csefalvay |
| 2020/0249996 A1 | 8/2020 | Addepalli et al. |
| 2021/0182662 A1* | 6/2021 | Lai ......................... G06N 3/045 |
| 2021/0264272 A1 | 8/2021 | Luo et al. |
| 2023/0040889 A1 | 2/2023 | Teig et al. |
| 2023/0222353 A1* | 7/2023 | Lioutas .................. G06N 3/094 |
| | | 706/25 |
| 2024/0371500 A1* | 11/2024 | Rubin .................... G06N 3/096 |

OTHER PUBLICATIONS

Duda, Jarek, "Asymmetric Numeral Systems: Entropy Coding Combining Speed of Huffman Coding with Compression Rate of Arithmetic Coding," Jan. 6, 2014, 24 pages, arXiv:1311.2540v2, Computer Research Repository (CoRR)—Cornell University, Ithaca, NY, USA.

Eisele, Robert, "The log-sum-exp trick in Machine Learning," Computer Science & Machine Learning, Jun. 22, 2016, 3 pages.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Guo, Jianping, et al., "Knowledge Distillation: A Survey," May 20, 2021, 36 pages, retrieved from https://arxiv.org/abs/2006.05525.

Hinton, Geoffrey, et al., "Distilling the Knowledge in a Neural Network," Mar. 9, 2015, 9 pages, retrieved from https://arxiv.org/abs/1503.02531.

Huang, Gao, et al., "Multi-Scale Dense Networks for Resource Efficient Image Classification," Proceedings of the 6th International Conference on Learning Representations (ICLR 2018), Apr. 30-May 3, 2018, 14 pages, ICLR, Vancouver, Canada.

Jain, Anil K., et al., "Artificial Neural Networks: A Tutorial," Computer, Mar. 1996, 14 pages, vol. 29, Issue 3, IEEE.

Li, Hong-Xing, et al., "Interpolation Functions of Feedforward Neural Networks," Computers & Mathematics with Applications, Dec. 2003, 14 pages, vol. 46, Issue 12, Elsevier Ltd.

Mandelbaum, Amit et al., "Distance-based Confidence Score for Neural Network Classifiers," Sep. 28, 2017, 10 pages, arXiv:1709.09844v1, Computer Research Repository (CoRR) , Cornell University, Ithaca, NY, USA.

Non-published Commonly Owned U.S. Appl. No. 18/115,616, filed Feb. 28, 2023, 54 pages, Perceive Corporation.

Non-published Commonly Owned U.S. Appl. No. 18/115,618, filed Feb. 28, 2023, 55 pages, Perceive Corporation.

Non-published Commonly Owned U.S. Appl. No. 18/115,622, filed Feb. 28, 2023, 55 pages, Perceive Corporation.

Polino, Antonio, et al., "Model Compression via Distillation and Quantization," ICLR 2018 Conference Paper, Feb. 15, 2018, 21 pages, retrieved https://arxiv.org/abs/1802.05668.

Shalev-Shwartz, Shai, et al., "Minimizing the Maximal Loss: How and Why," Proceedings of the 33rd International Conference on Machine Learning, Jun. 19-24, 2016, 13 pages, JMLR, New York, NY, USA.

Srivastava, Nitish, et al., "Dropout: A Simple Way to Prevent Neural Networks from Overfitting," Journal of Machine Learning Research, Jun. 2014, 30 pages, vol. 15, JMLR.org.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

* cited by examiner

Figure 4:
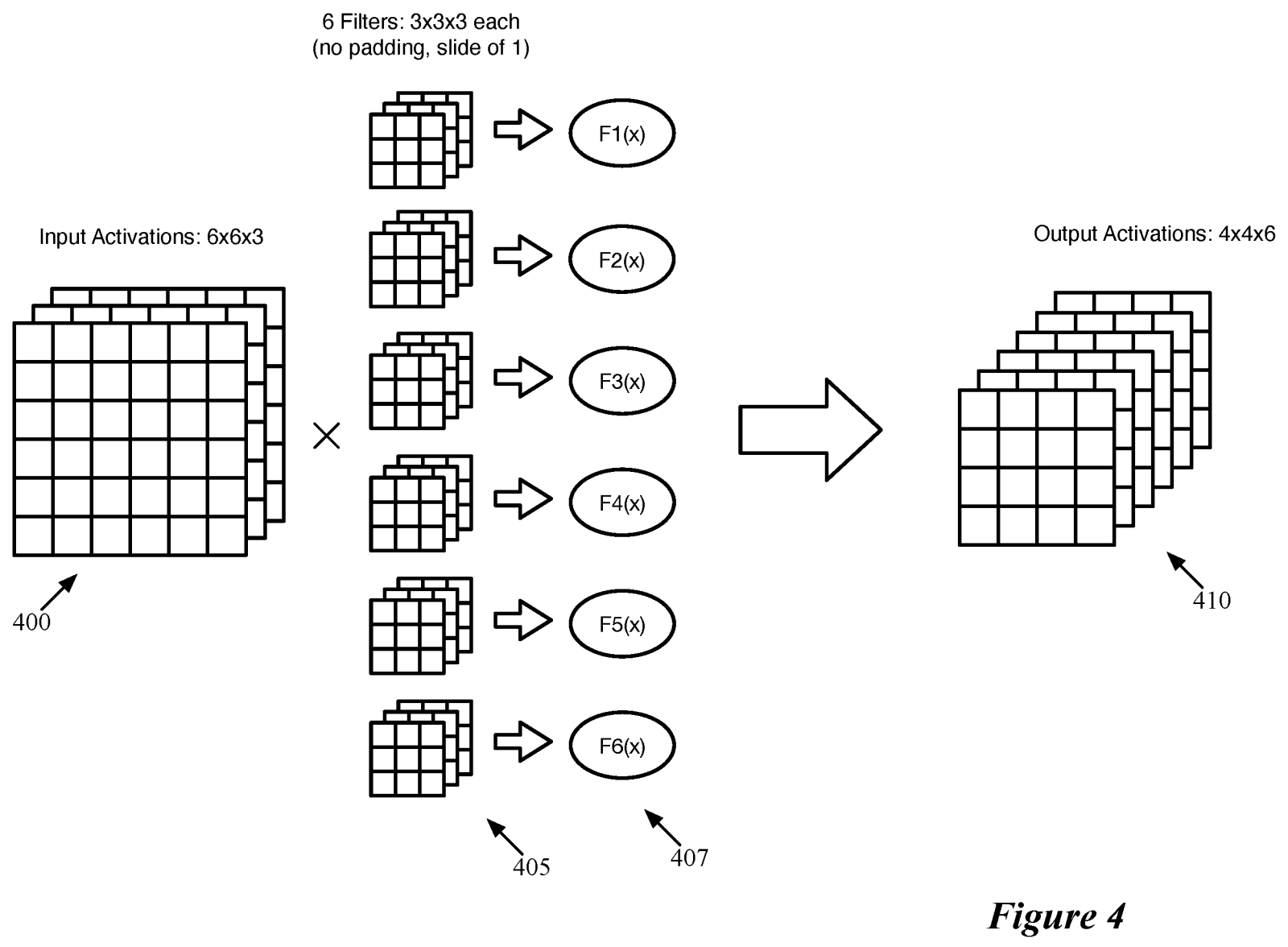

Output Activations: 4x4x6

410

F1(x)  F2(x)  F3(x)  F4(x)  F5(x)  F6(x)

407

405

6 Filters: 3x3x3 each
(no padding, slide of 1)

×

Input Activations: 6x6x3

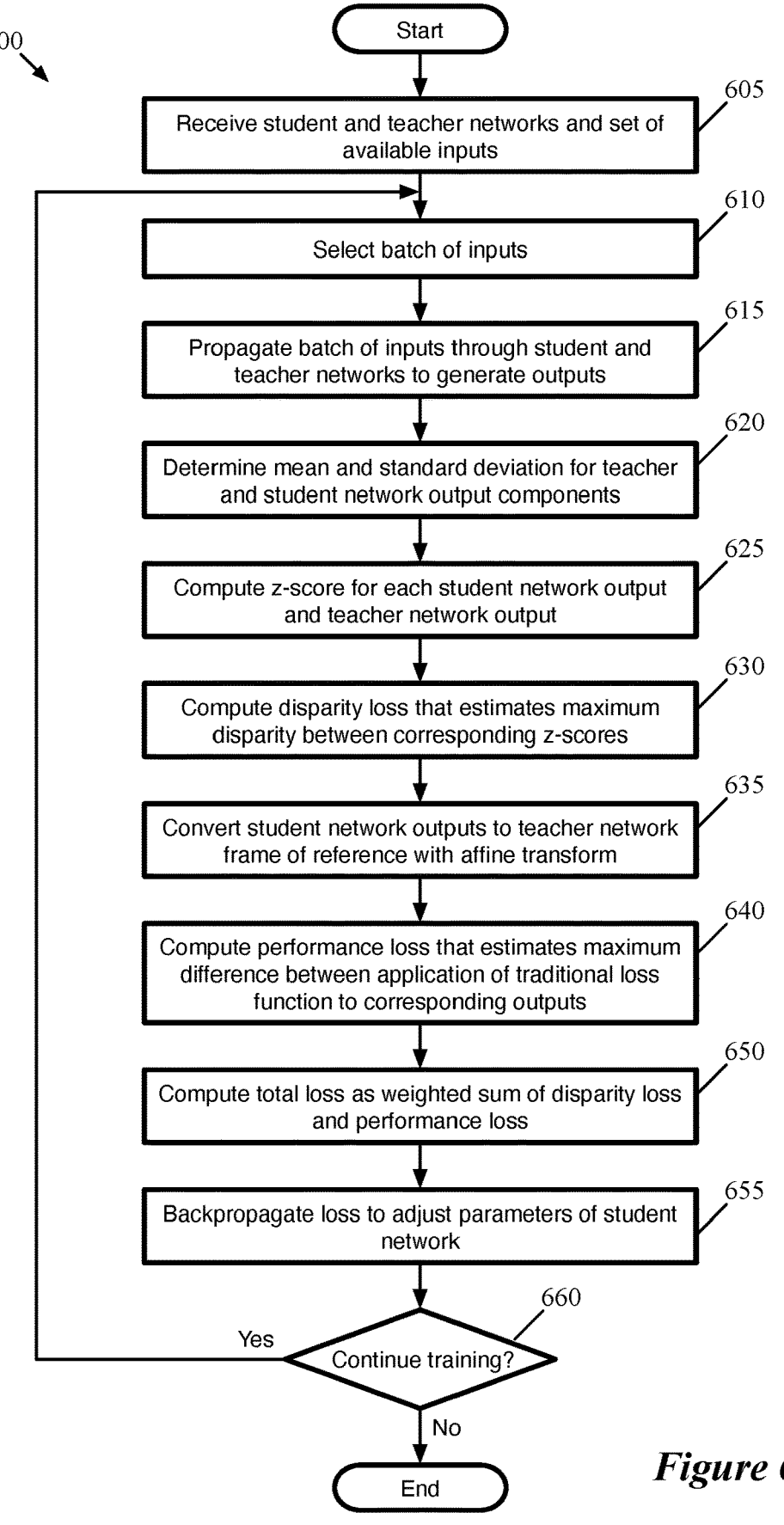

600

Start

Receive student and teacher networks and set of available inputs — 605

Select batch of inputs — 610

Propagate batch of inputs through student and teacher networks to generate outputs — 615

Determine mean and standard deviation for teacher and student network output components — 620

Compute z-score for each student network output and teacher network output — 625

Compute disparity loss that estimates maximum disparity between corresponding z-scores — 630

Convert student network outputs to teacher network frame of reference with affine transform — 635

Compute performance loss that estimates maximum difference between application of traditional loss function to corresponding outputs — 640

Compute total loss as weighted sum of disparity loss and performance loss — 650

Backpropagate loss to adjust parameters of student network — 655

Continue training? — 660

Yes

No

End

*Figure 6*

TRAINING NATURAL LANGUAGE PROCESSING NETWORK BASED ON EXISTING NETWORK

BACKGROUND

This application claims the benefit of U.S. Provisional Patent Application 63/437,098, filed Jan. 4, 2023, U.S. Provisional Patent Application 63/438,630, filed Jan. 12, 2023, and U.S. Provisional Patent Application 63/464,334, filed May 5, 2023. U.S. Provisional Patent Applications 63/437,098, 63/438,630, and 63/464,334 are incorporated herein by reference.

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), Neural Turing Machines (NTM), and transformer networks.

Training of these networks from scratch can require (i) extremely large datasets that are not easily accessible, (ii) extremely long time durations, and (iii) massive processing power. For example, powerful natural language processing neural networks can require more than a year of training. These networks may be extremely large, with millions (if not billions) of parameters (and in fact are often overparametrized), and require extensive processing power for execution. However, much smaller networks that can perform nearly as well using far less processing power could be executed at the edge (e.g., on Internet of Things devices, smart phones, etc.) rather than in large datacenters. Training these smaller networks can require similarly large datasets, reducing their advantage over the existing trained large networks. However, if an existing network can be used to train a smaller network with a significantly-reduced dataset, this alleviates the training dataset problem.

BRIEF SUMMARY

Some embodiments of the invention provide a network training system that trains a new natural language processing (NLP) network (a "student" NLP network) from an existing previously-trained NLP network (a "teacher" NLP network) by focusing training on inputs with the largest disparity between student network outputs and teacher network outputs. This training system, in some embodiments, translates the student network outputs and teacher network outputs, which may be at different scales (e.g., due to properties of the different networks), but having the same shape (e.g., the same number of individual output components) into an equivalent format (e.g., z-scores) in order to compute the disparities between the student network outputs and the teacher network outputs.

In some embodiments, the training system uses a loss function that includes both (i) a first "disparity" term that accounts for the disparities (e.g., the maximum disparity) between corresponding network outputs for the same input (e.g., the z-scores of the network outputs) and (ii) a second "performance" term that accounts for the disparities (e.g., the maximum disparity) between application of a different, traditional loss function to the student network outputs and the corresponding teacher network outputs. In some such embodiments, the student network outputs are translated to a frame of reference of the teacher network outputs to apply the traditional loss function to the student network outputs.

NLP networks based on transformer decoders typically receive a set of text as input and deterministically (based on many trained parameters) generate an output vector (e.g., a 768-component vector) that is an embedding of a next word to append to the input text. This embedding is then provided to a post-processor that selects the next word based on the embedding. In some embodiments, the embedding does not necessarily correlate to a single next word, but rather can be treated as implying a probability distribution.

In practice (i.e., at inference), such an NLP network starts with a set of text, generates an embedding (output vector) for the next word, and provides this embedding to the post-processor. The post-processor then selects the next word based on the embedding and appends this word to the input text. The new input text (the original input text with the selected next word appended) is then provided back to the NLP network again, which generates a new embedding for another word. This process can be repeated to add words until a stopping condition is reached. While the repetitive process is stateful (i.e., because the input text for the second and subsequent word selections is dependent on the previous non-deterministic selections by the post-processor), the actual NLP network is deterministic. That is, the NLP network is a "meta-Markov chain" that is deterministic but generates a Markov chain when iteratively applied (with the outputs passed to the post-processor), but is not it a Markov chain. Thus, the state is not stored in the network, but rather in the subsequent inputs (i.e., the original input along with the subsequent generated words).

As such, although the entire process is stateful, the training of the NLP network need not be, and therefore a teacher NLP network can be used to train a functional student NLP network. The student NLP network is trained on text inputs, with the outputs compared to the outputs of the teacher NLP network in order to train the student NLP network. These training text inputs can mimic the iterative, stateful process used during inference in some embodiments, but do not need to.

NLP networks are often very large networks with billions (or more) of parameters, and require massive amounts of time and resources in order to be trained to perform a specific purposes (e.g., as a chatbot). The amount of inputs required for this training can be prohibitive as well, such that training can take many months or even a year or longer. In addition, with so many parameters, these trained networks are expensive to run at inference time.

A student network is often a significantly smaller (e.g., fewer layers, fewer filters per layer, and/or fewer weights per filter) network than the teacher network (the student and teacher networks may be convolutional neural networks, other types of neural networks, etc.). In certain cases, the teacher network is a floating-point network that uses more arbitrary floating-point values (e.g., 32-bit or 64-bit floating point values) for weights, intermediate activations, and/or outputs. The student network, on the other hand, may be a quantized network that uses quantized (e.g., ternary) weights, quantized (e.g., 4-bit and/or 8-bit) intermediate activations, and quantized (e.g., 8-bit) output values. In some embodiments, the student network is designed to be executed on specialized hardware (e.g., a specialized neural network inference circuit) that requires such quantization. In addition, the student network need not follow the same structure as the teacher network in some cases.

In some embodiments, as mentioned, the equivalent format used to compare the student network outputs and the teacher network outputs is a z-score. The student network outputs and teacher network outputs may not be on the same scale or centered at the same value (depending on the type of network, bits available for the outputs, etc.), so direct comparison of the outputs will not necessarily work correctly. For instance, for NLP, the teacher network might output a vector with 768 floating-point values while the student network outputs a vector with 768 quantized (e.g., 4-bit) values.

The training system propagates the same batch of training inputs through the student network and the teacher network to generate the student network outputs and the corresponding (i.e., generated for the same input) teacher network outputs. The training system also determines the respective means and standard deviations for the student network outputs and the teacher network outputs and uses these to compute the z-score for each output. For instance, the student network output mean is subtracted from each student network output and these results are each divided by the student network standard deviation, with the corresponding operation performed on the teacher network outputs. In some embodiments, the student network mean and standard deviation are computed for a batch of inputs and used to compute the z-scores for those inputs. In other embodiments, the mean and standard deviation used to compute the z-scores (and, as discussed below, translate the inputs into the frame of reference of the teacher network) are learned parameters of the network.

The training system compares the z-score of each student network output to the z-score of the corresponding teacher network output. Because the existing teacher network is assumed to be trained correctly, for an optimized student network there should not be any disparity between the z-scores of corresponding network outputs. During training, the loss function therefore measures these disparities. However, rather than computing an average disparity for a set of inputs, some embodiments use a loss function that focuses the training on the maximum disparities (i.e., the inputs for which the student network output diverges most from the corresponding teacher network output, once translated into z-scores). This ensures that the student network will not have outputs for which the network generates a dramatically incorrect output. Some embodiments use a continuously-differentiable loss function that estimates the maximum function of the disparities. For instance, different embodiments may use a log-sum-exponent function of the disparities, a p-norm function of the disparities, or a Boltzmann expected energy function of the disparities.

In addition to this disparity loss function term, some embodiments also include a performance term that accounts for the disparities (e.g., again using the maximum disparity) between application of a traditional loss function to the student network outputs and the corresponding teacher network outputs. The traditional loss function, in some embodiments, compares the generated network output for a given input to the expected (ground-truth) output for that input (e.g., the cross-entropy loss for classification network outputs).

To properly compare the traditional loss function values for student network outputs and teacher network outputs, some embodiments translate the student network outputs into the frame of reference of the teacher network outputs before applying the traditional loss function. In some embodiments, this involves subtracting the student network output mean and dividing by the student network standard deviation, then multiplying by the teacher network standard deviation and adding the teacher network mean to each student network output. In some embodiments, rather than strictly using the teacher network standard deviation and mean, the training system learns an affine transform on a per-student-network-output basis.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 4 conceptually illustrates a representation of a convolutional layer of a convolutional neural network.

FIG. 6 conceptually illustrates a process of some embodiments for training a student machine-trained network based on a previously-trained teacher network.

DETAILED DESCRIPTION

Some embodiments of the invention provide a network training system that trains a new natural language processing (NLP) network (a "student" NLP network) from an existing previously-trained NLP network (a "teacher" NLP network) by focusing training on inputs with the largest disparity between student network outputs and teacher network outputs. This training system, in some embodiments, translates the student network outputs and teacher network outputs, which may be at different scales (e.g., due to properties of the different networks), but having the same shape (e.g., the same number of individual output components) into an equivalent format (e.g., z-scores) in order to compute the disparities between the student network outputs and the teacher network outputs.

In some embodiments, the training system uses a loss function that includes both (i) a first "disparity" term that accounts for the disparities (e.g., the maximum disparity) between corresponding network outputs for the same input (e.g., the z-scores of the network outputs) and (ii) a second "performance" term that accounts for the disparities (e.g., the maximum disparity) between application of a different, traditional loss function to the student network outputs and the corresponding teacher network outputs. In some such embodiments, the student network outputs are translated to a frame of reference of the teacher network outputs to apply the traditional loss function to the student network outputs.

Figure 1:
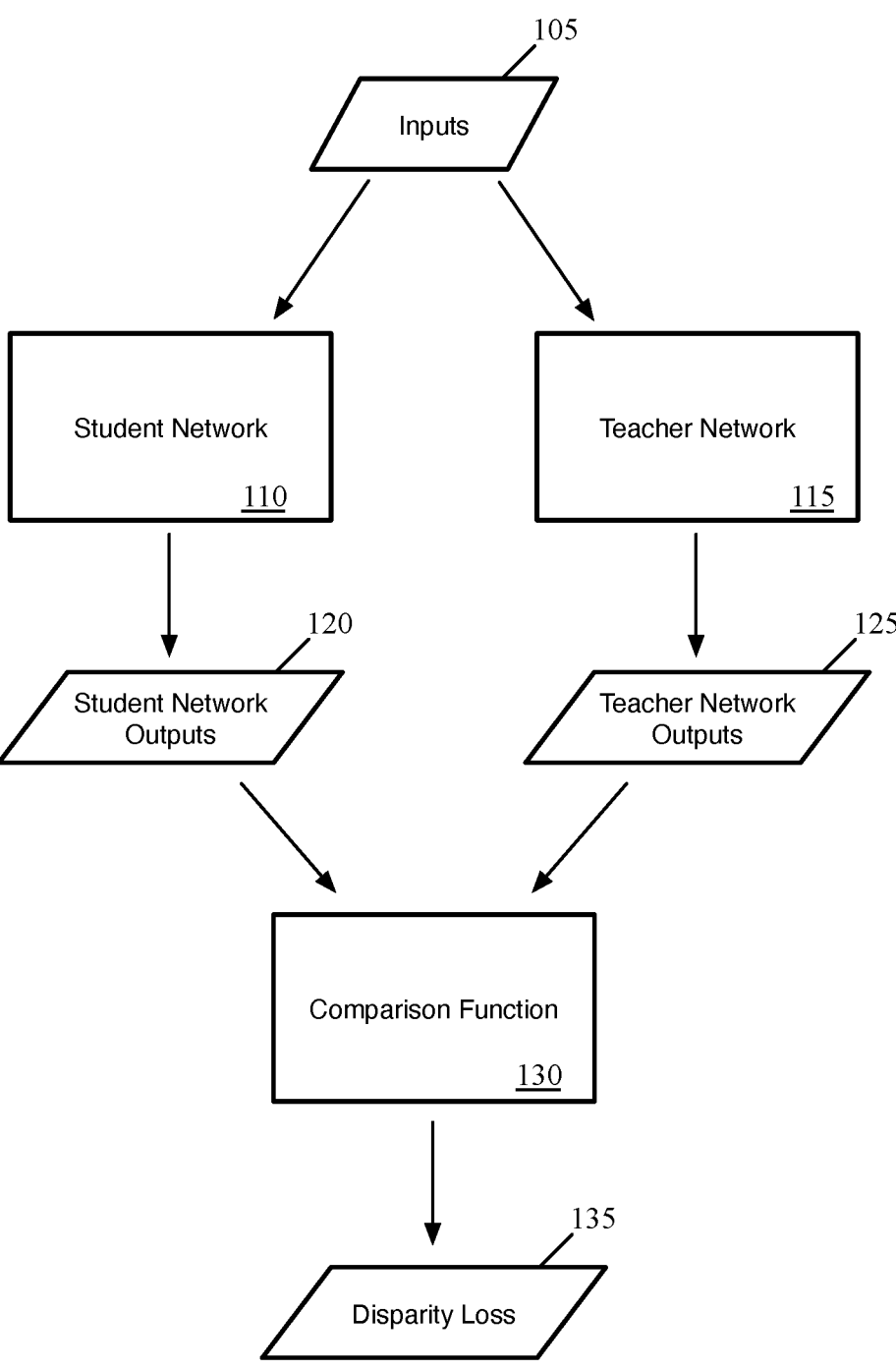
FIG. 1 conceptually illustrates the generalized concept of disparity loss, the primary factor used to train the student network.

FIG. 1 conceptually illustrates the generalized concept of the disparity loss, the primary factor used to train the student network. It should be noted that this and subsequent discussion refers to teacher and student networks generally, and can be applied to NLP networks as well as networks for other purposes (e.g., image processing). As shown in this figure, a set of inputs 105 (e.g., a minibatch) are propagated through both the student network 110 and the teacher network 115. These networks may be any type of machine-trained network in some embodiments—e.g., feed-forward neural networks, recurrent neural networks, long short-term memory networks, transformer-based networks for performing NLP, etc. The teacher network 115 is assumed to previously have been trained to an acceptable level of accuracy for the task that it performs, with the goal being to quickly train the student network 110 to at least approach this level of accuracy more quickly (and with less input data) than would be needed if starting the student network training from scratch. For instance, the teacher network 115 could be an existing (e.g., public domain) NLP network that has been trained to perform a specific NLP task (e.g., as a chatbot, a virtual assistant, etc.).

Propagating the inputs 105 through the networks 110 and 115 generates a set of student network outputs 120 and corresponding teacher network outputs 125, with each student network output having a corresponding teacher network output that is generated for the same input. When the student network is optimally trained, each student network output should match its corresponding teacher network output (once translated to an equivalent format). Based on this premise, some embodiments use a comparison function 130 as a loss function. This comparison function 130 calculates the disparity between each student network output and its corresponding teacher network output to compute a disparity loss 135 that is used to train the student network.

Figure 2:
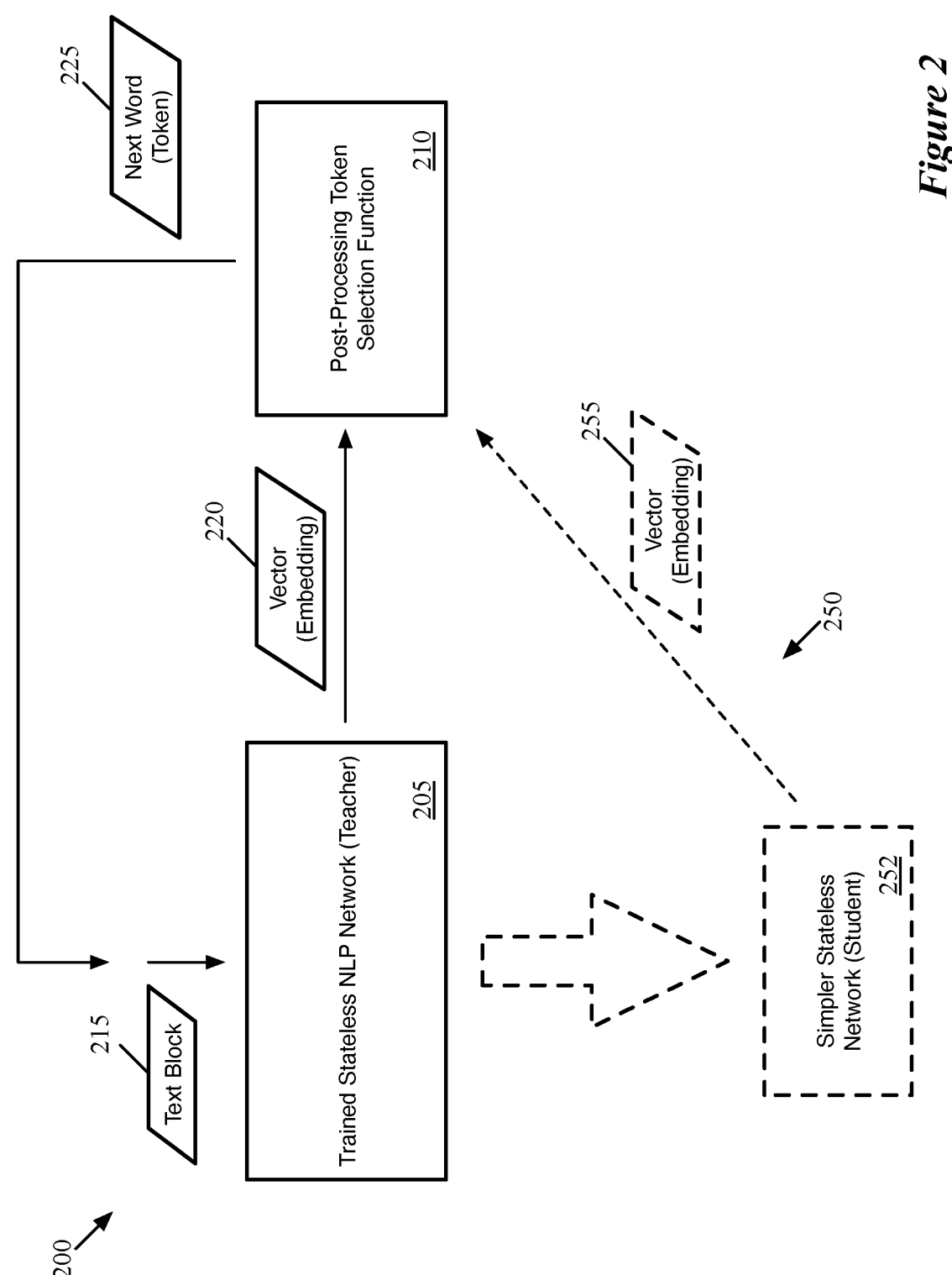
FIG. 2 conceptually illustrates the structure of a natural language processing model and the training of a simpler (e.g., with fewer and quantized parameters) model from that existing model.

FIG. 2 conceptually illustrates the structure of a natural language processing model 200 and the training of a simpler (e.g., with fewer and quantized parameters) model 250 from that model 200. As shown, the NLP model 200 includes (i) a trained stateless NLP network 205 and a post-processing token selection function 210.

The stateless NLP network 205 is a network based on transformer decoders (e.g., BERT, a GPT network, etc.) in some embodiments. This network 205 receive a text block 215 (of varying length) as input and deterministically generates an output vector 220 (e.g., a 768-component vector). In some embodiments, this output vector 220 is an embedding that represents the next token (e.g., word, punctuation mark, etc.) to append to the text input. In some embodiments, the embedding 220 does not necessarily correlate to a single token, but rather can be treated as implying a probability distribution across a set of potential next tokens.

In the operation of the NLP model 200, the embedding is provided to the post-processing token selection function 210. This selection function 210 selects the next token (e.g., the next word, punctuation mark, etc.) 225 based on the embedding. During inference, this selected token 225 is appended to the input text 215 and the entire text is used as the next input to the NLP network 205.

As such, the NLP model 200 as whole operates statefully during inference. That is, the input text for the second and subsequent executions of the stateless NLP network 205 to generate new embeddings is dependent on the non-deterministic post-processing token selection function 210. However, for each individual input provided to the NLP network 205, the network 205 deterministically generates an embedding. That is, the NLP network 205 is a "meta-Markov chain" that is deterministic but generates a Markov chain when iteratively applied with the output embeddings passed to the post-processing token selection function 210 (but the network 205 is not itself a Markov chain). Thus, the state is not stored in the network, but rather in the subsequent inputs (i.e., the original input along with the subsequent generated tokens).

Thus, although the entire model 200 is stateful during inference, the training of the NLP network need not be. Therefore, a teacher NLP network can be used to train a functional student NLP network as shown in FIG. 1. A student NLP network 252 is trained on text inputs, with the outputs compared to the outputs of the teacher NLP network in order to train the student NLP network. These training text inputs can mimic the iterative, stateful process used during inference in some embodiments, but do not need to. As shown in FIG. 2, the student NLP network 252 also passes a vector embedding 255 to the same post-processing token selection function 210. The vector embedding 255 may have different ranges for its constituent values while being of the same shape (e.g., the same number of components) as the vector embedding 220. Thus, the NLP model 250 formed by the combination of the student NLP network 252 with the post-processing token selection function 210 works in the same manner as the original model 200 (while requiring far fewer resources).

NLP networks such as the network 205 are often very large networks with billions (or more) of parameters, and require massive amounts of time and resources in order to be trained to perform a specific purposes (e.g., as a chatbot). The amount of inputs required for this training can be prohibitive as well. Not only is the amount of text inputs needed for training these networks massive (e.g., using large swaths of the text available on the World Wide Web), the training can require many months (or even a year or longer) and use entire datacenters. Even at inference time, given the large size of the networks (i.e., potentially billions of parameters), the networks can be expensive to execute.

The student network 252 is often a significantly smaller network (e.g., fewer layers, fewer filters per layer, and/or fewer weights per filter) than the teacher network (the student and teacher networks may be convolutional neural networks, other types of neural networks, etc.). In certain cases, the teacher network is a floating-point network that uses more arbitrary floating-point values (e.g., 32-bit or 64-bit floating point values) for weights, intermediate activations, and/or outputs. The student network, on the other hand, may be a quantized network that uses quantized (e.g., ternary) weights, quantized (e.g., 4-bit and/or 8-bit) intermediate activations, and quantized (e.g., 8-bit) output values. In some embodiments, the student network is designed to be executed on specialized hardware (e.g., a specialized neural network inference circuit) that requires such quantization. In addition, the student network need not follow the same structure as the teacher network in some cases.

Because of these differences, in some embodiments the student network may use a different output range compared to the teacher network (e.g., with a different mean and scale) for the individual output components such that direct comparison of corresponding outputs is not useful. For instance, in some embodiments, a teacher NLP network and student network both output embedding vectors with the same number of components (e.g., 768, 1024), but these components may have different value ranges between the teacher and student networks. Thus, some embodiments compute the z-scores for each network output (of both the student and teacher networks) and compare these z-scores rather than the raw outputs to compute the disparity loss. Details of these calculations are described further below.

Figure 3:
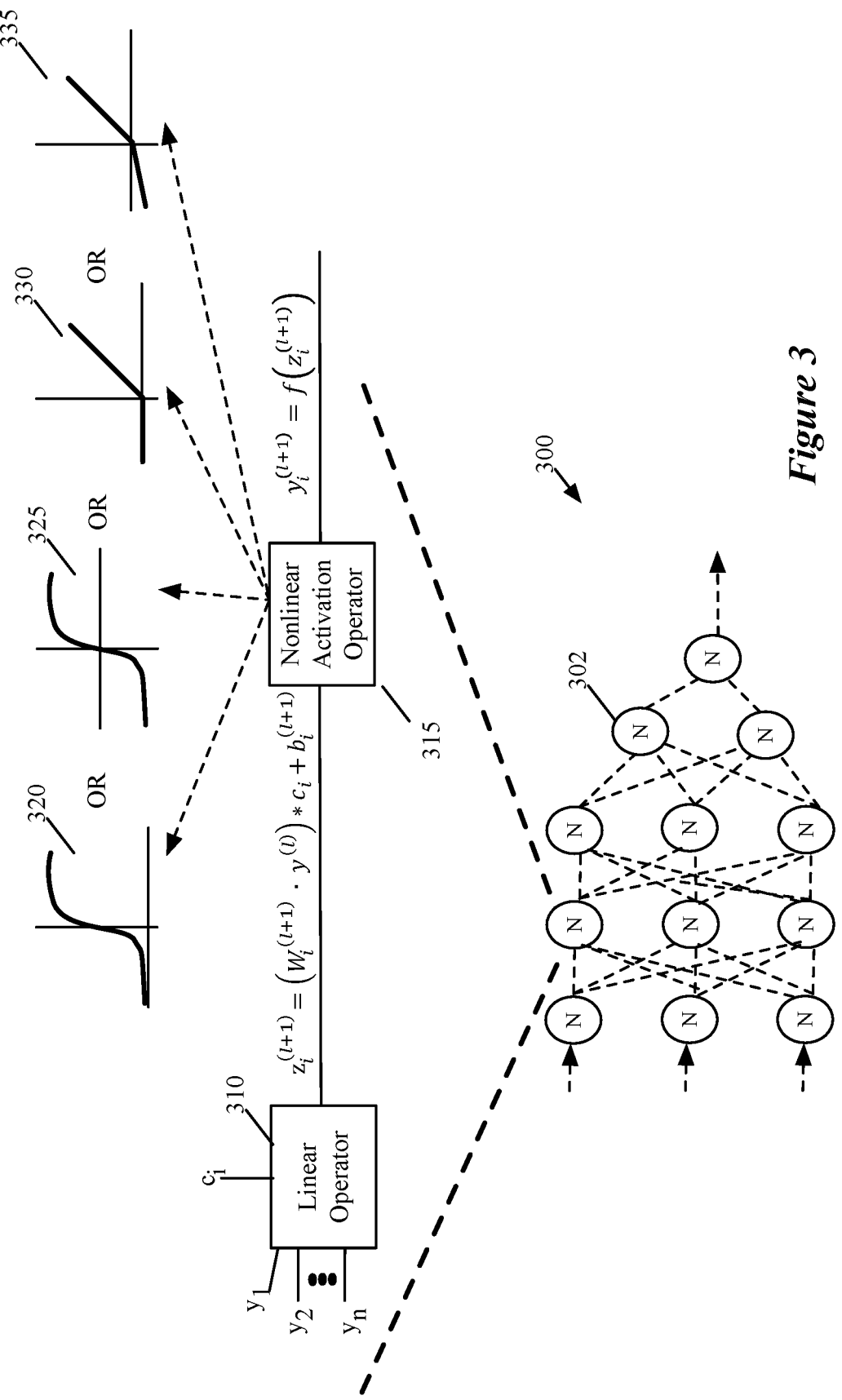
FIG. 3 illustrates an example of a multi-layer machine-trained network of some embodiments.

Before describing the details of the training process, neural networks of some embodiments will be described in more detail. FIG. 3 illustrates an example of a multi-layer machine-trained network of some embodiments. This figure illustrates a feed-forward neural network 300 that has multiple layers of processing nodes 302 (also called neurons). In all but the first (input) and last (output) layer, each node 302 receives two or more outputs of nodes from earlier processing node layers and provides its output to one or more nodes in subsequent layers. The output of the node (or nodes) in the last layer represents the output of the network 300. In different embodiments, the output of the network 300 is a number in a range of values (e.g., 0 to 1), a vector representing a point in an N-dimensional space (e.g., a 128-dimensional vector), a value representing one of a predefined set of categories (e.g., for a network that classifies each input into one of eight possible outputs, the output could be a three-bit value), a set of likelihoods (e.g., percentages adding up to 1) that an input is classified into each of a set of possible categories, or another format. In some embodiments, the individual components of an output are referred to as output components, or logits (e.g., a classification network that outputs the probabilities for 10 different categories, adding up to 1, would have 10 logits per output). In addition, some embodiments apply a scale and/or shift to the output values in order to, e.g., center the output values on a desired value or change the scale of the output values.

In this example, the neural network 300 only has one output node. Other neural networks of other embodiments have several output nodes that provide more than one output value. Furthermore, while the network 300 includes only a few nodes 302 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, long short-term memory networks, radial basis function networks, etc.).

The illustrated network 300 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, element-wise operation layers, fully-connected layers, and/or normalization layers. The convolutional layers of some embodiments use a small kernel (e.g., 2×2, 3×3, 5×5, etc.) to process blocks of input values (output values from a previous layer) in a set of two-dimensional grids (also referred to as input channels or input feature maps) with the same set of parameters. The kernels (also referred to as filters) are three-dimensional, and multiple kernels are used to process each group of input values in a layer (resulting in a set of three-dimensional output grids, also referred to as output channels or output feature maps). Element-wise operation layers typically combine values from two previous layers using, e.g., addition or multiplication. Pooling layers combine clusters of outputs from one layer into a single node at the next layer, as part of the process of reducing an image (which may have a large number of pixels) or other input item down to a smaller size (e.g., a vector output). In some embodiments, pooling layers can use max pooling (in which the maximum value among the clusters of node outputs is selected) or average pooling (in which the clusters of node outputs are averaged).

FIG. 4 conceptually illustrates a representation of a convolutional layer of a convolutional neural network. The convolutional layer receives a set of input activation values 400 organized as a three-dimensional array. This three-dimensional array is typically either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, also referred to as input feature maps or input channels for the layer, as shown in the figure. In this example, the dimensions of the input values are 6×6×3 (i.e., three 6×6 input channels).

Each computation node of the convolutional layer involves a linear component (e.g., a dot product followed by scaling and bias functions) as well as a non-linear component (the activation function). The input to each computation node is a subset of the input activation values, and the dot product for the computation node involves multiplying those input activation values by the weights that make up one of the filters of the layer. As shown, in this example the layer includes six filters 405, each of which is 3×3×3. Each value in one of the filters is a weight value that is trained using various techniques (some of which are described herein). Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three input feature maps, or channels, so the depth of the filters is three). The number of filters in a given layer can also vary; in general, each filter is attempting to identify the presence or extent of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 405 is applied to numerous subsets of the input activation values

9

400. Specifically, in a typical convolution layer, each 3×3×3 filter is moved across the three-dimensional array of activation values, and the dot product between the 27 activations in the current subset and the 27 weight values in the filter is computed. This process starts in the top left corner (e.g., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids (e.g., to allow for better detection of features at the edges of images).

Each computation node, in some embodiments, involves this dot product as well as the subsequent operations to generate the output activation values. The linear component includes any scale and/or bias calculations, and the non-linear component involves applying an activation function to the output of the linear component. As shown in the figure, each filter 405 has an associated activation function 407. In some embodiments, the activation function associated with a particular filter is the function applied to the output of the linear component of each computation node that uses that particular filter. Different embodiments may use the same activation function for all filters of a layer (and therefore all nodes in the layer) or have different activation functions associated with different filters (e.g., different types of activation functions or activation functions of the same type but with different parameters).

The output activation values 410 are arranged in a 4×4×6 array in this example. The outputs from a single filter are arranged in a single grid (also referred to as an output feature map or output channel), and because the example has six filters 405, the output activations have six output feature maps. Using a slide value of 1 with no zero-padding results in a 4×4 output feature map for each filter. These output activation values 410 are then the input activation values for the next layer of the neural network.

Returning to FIG. 3, each node in the neural network 300 has a linear component 310 and a nonlinear component 315. The linear component 310 of each hidden or output node in this example computes a dot product of a vector of weight coefficients and a vector of output values of prior nodes (i.e., as described above for convolutional layers), multiplies this by a scaling value (which may be set to 1), and adds an offset. In other words, in a convolutional or fully-connected layer, a node's linear operator computes a scaled weighted sum of its inputs (which are typically outputs of the previous layer of nodes) plus an offset (also referred to as a bias). Similarly, the linear component 310 of each input node of some embodiments computes a dot product of a vector of weight coefficients and a vector of input values, scales this dot product, and adds an offset. In other embodiments, each input node receives a single input and passes that input as its output. Each node's nonlinear component 315 computes an activation function based on the output of the node's linear component 310 to generate the node output (also referred to as an activation value), which is then used as input to the next layer of nodes.

The notation of FIG. 3 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with l=0 representing the input layer and l=L representing the output layer). The variable $z_i^{(l+1)}$ represents the output of the linear component 310 of a hidden node i in layer l+1. As indicated by the following Equation (1), the variable $$z_i^{(l+1)}$$

is computed as the dot product of a vector of weight values $$W_i^{(l+1)}$$

and a vector or outputs $y^{(l)}$ from layer l multiplied by a scaling value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad (1)$$

The scaling value $c_i$ is a value to which all the weight values for the node are normalized. In some embodiments, the scaling value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments require that at least a threshold percentage of the weight values (for a given layer or for the entire network) are equal to zero (e.g., 75%, 80%, etc.).

The output $y_i^{(l+1)}$ of the nonlinear component 315 of a node in layer l+1 is a function of the node's linear component, and can be expressed as by Equation (2) below:

$$y_i^{(l+1)} = f\left(z_i^{(l+1)}\right). \quad (2)$$

In this equation, f is the nonlinear activation function for node i. Examples of such activation functions include a sigmoid function 320 ($f(x)=1/(1+e^{-x})$), a tanh function 325, a ReLU (rectified linear unit) function 330, a leaky ReLU function 335, a swish function (shown above), etc. In some embodiments, the activation functions can be other types of functions, like cup functions, periodic functions, piecewise linear functions, etc.

Equation (2) can be expressed in the following expanded format of Equation (3):

$$y_i^{(l+1)} = f\left(z_i^{(l+1)}\right) = f\left[\left(\sum_{k=1}^{n} w_{ik} * y_k\right) * c_i + b_i^{(l+1)}\right]. \quad (3)$$

In this equation, $w_{ik}$ are weight values associated with the inputs $y_k$ of the node i in layer l+1.

Before a multi-layer network (e.g., a convolutional neural network) can be used to perform a particular task, the network is put through a supervised training process that adjusts the network's configurable parameters (e.g., the weight values, biases, etc.). The training process iteratively selects different input value sets with known output value sets. When training a typical network from scratch, the training system typically (1) forward propagates batches of input value sets through the network's nodes to produce a computed output value set and then (2) backpropagates a gradient (rate of change) of a loss function (output error) that quantifies in a particular way the difference between the input sets' known output value sets and the input sets' computed output value sets, in order to adjust the network's configurable parameters (e.g., the weight values, biases, etc.).

In some embodiments, at the end of the training of the network, each of the weights is restricted to a set of allowed quantized weight values (e.g., the set $\{0, 1, -1\}$ or $\{0, \alpha_k, -\alpha_k\}$, where $\alpha_k$ is a scale value that varies for different layers or filters). In addition, in some embodiments, the training is further complicated because the output values of each layer are quantized (e.g., to a particular number of bits), as described above. The combination of (i) weight quantization (e.g., ternarization), (ii) weight sparsity (ensuring that a threshold of the weight values are equal to zero), and (iii) output value quantization allows for the network to be implemented by a specialized neural network inference circuit of some embodiments that puts restrictions on the weight and intermediate layer output value sizes in the interest of power and memory savings.

Figure 5:
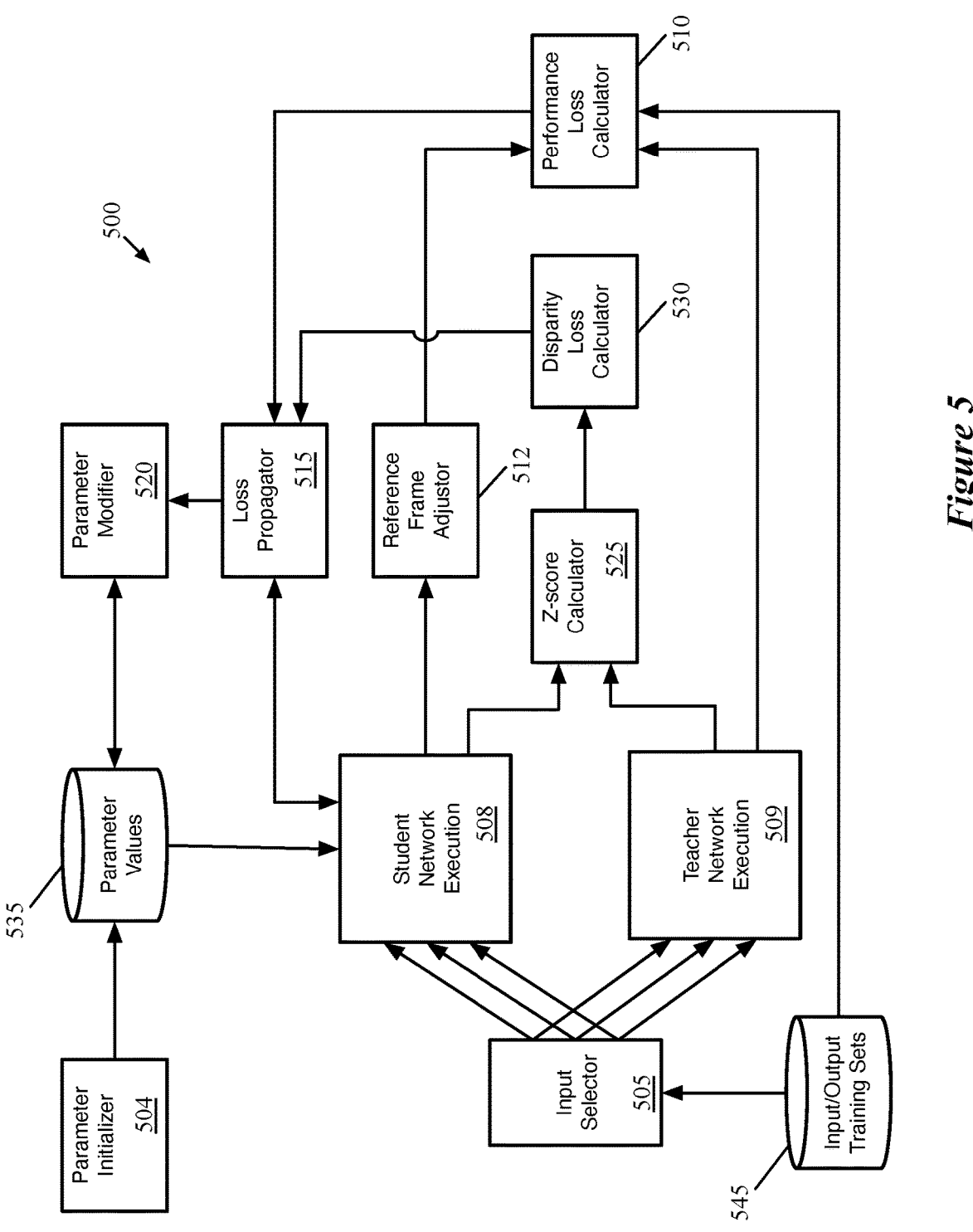
FIG. 5 conceptually illustrates a training system of some embodiments that trains the weight values (and other parameters) of a new neural network based on an existing previously-trained neural network.

As discussed, rather than train an NLP network executable by such a specialized circuit from scratch, some embodiments use an existing NLP network that has been trained to perform a particular task (e.g., as a chatbot, virtual assistant, etc.) and train a new NLP network to perform the same task, based on that existing network (i.e., using the knowledge contained in that existing network). FIG. 5 conceptually illustrates a training system 500 of some embodiments that trains the weight values (and other parameters) of a new neural network ("student network") based on an existing previously-trained neural network ("teacher network"). The teacher network and student network may have similar architectures or completely different architectures in different embodiments; that is, the internal structure of the student network need not match or even bear similarity to the teacher network. For instance, the teacher network could be a network based on transformer decoders while the student network is a simpler feed-forward convolutional network. In other cases, the student network is simply a smaller and/or quantized version of the teacher network (e.g., using fewer and smaller transformer decoders). The subsequent discussion, while not limited to NLP networks, applies to these such networks as well as other types of stateless networks.

As shown, the training system 500 has a number of modules, including a parameter initializer 504, an input selector 505, a student network execution module 508 and a teacher network execution module 509, a performance loss calculator 510, a reference frame adjustor 512, a z-score calculator 525, a disparity loss calculator 530, a loss propagator 515, and a parameter modifier 520, all of which will be described in further detail below. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines, containers, etc.), or separate instances may execute on multiple devices (or virtual machines, containers, etc.) for additional computing power.

The parameter initializer 504 takes as input the student network structure and generates initial (typically random) parameter values for the student network. In some embodiments, the neural network weights are floating-point weight values restricted to values ranging from −1 to 1, while other embodiments do not restrict the weight values at all. The initial weight values and other parameters (e.g., biases) are stored in a parameter storage 535. In some embodiments, the parameter storage 535 stores the most recent set of trained parameters, which change throughout training. Other embodiments store a history of the sets of parameter values for the network, which allows review of how parameters may have changed throughout the training.

The network execution modules 508 and #409 of some embodiments handle the actual execution of the student and teacher networks respectively (forward propagation of inputs) during training. The teacher network execution module 509 applies the existing network structure with its trained parameters to a set of inputs (e.g., text blocks of varying sizes) in order to propagate these inputs through the teacher network and generate outputs (e.g., embeddings that each represent a next token to be appended to the corresponding input text block) for each of the inputs. The teacher network is assumed to be completely trained, so there is no need to modify the parameters of the teacher network. The outputs, however, are used for comparison with the student network outputs.

The student network execution module 508 applies the network structure of the student network using the current stored parameters 535 to the same set of inputs as for the teacher network (e.g., the same text blocks) in order to propagate these inputs through the network and generate corresponding outputs (e.g., embeddings). Each student network output has a corresponding input as well as a corresponding teacher network output. In some embodiments, the student network outputs have the same output shape as the teacher network outputs (i.e., the same number of individual logits). For instance, if the teacher network outputs a vector with 768 components (logits), then the student network should also output a 768-dimensional vector.

During forward propagation, the input selector 505 selects which inputs from the input/output sets 545 to propagate together through the network for a batch of inputs in a single training iteration (often referred to as a minibatch). In some embodiments, the input selector 505 also prepares these inputs for propagation through the network so that the network execution modules 508 and 509 can generate corresponding output values for the inputs. In some embodiments, there are two levels of input selection. First, a group of inputs is selected from the entire training set to be used as the training inputs for a training epoch. Second, for each batch within that epoch, a subset of inputs is selected from the previously-selected set.

The input/output sets 545 include various inputs to the networks as well as the corresponding expected (ground truth) outputs for each of the inputs. Some embodiments perform training with a large number of different inputs, as this can help train the weight values for an average input. As noted, in some embodiments, the number of inputs needed to train the student network is significantly smaller than the number of inputs previously used to train the teacher network. In fact, the training system 500 may not have access to the large input set used for the teacher (e.g., this may be a proprietary input set).

Each input in an input set may be a block of text, an image, a voice snippet, etc. that is to be propagated through the networks, depending on the specific purpose for which the student network is being trained (and for which the teacher network has already been trained). For example, if the student network is an NLP network being trained as a virtual assistant, the set of inputs will include numerous blocks of text of varying length and that are generally relevant to the purpose (e.g., the types of text blocks that would be likely to come up when composing e-mails). On the other hand, if the student network is being trained to identify faces, the set of inputs will include numerous images of several different people's faces, probably including various types of edge cases (e.g., images where the face is distorted, where objects partially appear in front of the face, etc.). Each input also has a corresponding expected (ground truth) output that is what the network should generate as its output when presented with that input.

The z-score calculator 525 of some embodiments computes z-scores for each student network output component and corresponding teacher network output component. As noted, some embodiments convert the outputs to an equivalent format for comparison, because the student network outputs and teacher network outputs may not be on the same scale or centered at the same value, and may even have different scales or means for different components (e.g., depending on the type of network, bits available for the outputs, etc.). As such, directly comparing the corresponding outputs (i.e., the student network outputs and teacher network outputs for the same inputs) may not actually be useful. Rather, some embodiments convert the outputs to z-scores, which can be directly compared.

To compute z-scores for the outputs, the z-score calculator 525 determines the respective means and standard deviations for the student network outputs and the teacher network outputs (e.g., the mean and standard deviation for each output component), then uses these to compute the z-score for each output component. Specifically, for each student network output component, the student network output component mean is subtracted from that component of each student network output and these results are each divided by the student network output component standard deviation, with the corresponding operation performed on the teacher network outputs. In some embodiments, the student network component means and standard deviations are computed for a batch of inputs and used to compute the z-scores for those inputs. In other embodiments, the means and standard deviations used to compute the z-scores (and, as discussed below, translate the outputs into the frame of reference of the teacher network) are learned parameters of the network. The teacher network mean and standard deviation are known, either as a known property of the teacher network or based on an accumulation of results over multiple batches (because the teacher network is unchanged throughout training).

The z-score calculator 525 provides these z-scores (e.g., for a batch of inputs) to the disparity loss calculator 530, which compares the z-score of each student network output component to the z-score of the corresponding teacher network output component (for each output). Because the existing teacher network is assumed to be trained correctly, for an optimized student network there should not be any disparity between the z-scores of corresponding network outputs (or at least this disparity should be minimized). As such, the disparity loss function measures these differences. Rather than computing an average disparity between student network output and teacher network output z-scores for a batch of inputs, some embodiments use a loss function that focuses the training on the maximum disparities. That is, the loss function penalizes (and therefore seeks to correct) the inputs for which the student network output components diverge most from the corresponding teacher network output components, once translated into z-scores. Using the max function or a continuously-differentiable function that estimates the maximum disparity in the batch helps to ensure that the student network will not be trained to be very good at most types of inputs but very poor on specific input types, instead correcting for the types of inputs that cause the most trouble for the student network. Examples of these continuously-differentiable maximum-approximating loss functions include using a log-sum-exponent function of the disparities, a p-norm function of the disparities, or a Boltzmann expected energy function of the disparities. Some embodiments use nested maximum-approximating functions, with the inner function approximating the maximum disparity for an individual output component of a single output and the outer function approximating the maximum disparity across all of the inputs (e.g., in a batch of inputs).

In addition to this disparity loss function, some embodiments also include a performance loss term that accounts for the disparities between application of a traditional loss function to the student network outputs and the corresponding teacher network outputs. To properly compare the traditional loss function values for student network outputs and teacher network outputs, the reference frame adjustor 512 of some embodiments translates the student network output components into the frame of reference of the teacher network outputs before applying the traditional loss function. In some embodiments, the reference frame adjustor 512 performs this translation by subtracting the student network output mean and dividing by the student network standard deviation, then multiplying by the teacher network standard deviation and adding the teacher network mean to each student network output. In some embodiments, rather than strictly using the teacher network standard deviation and mean, the reference frame adjustor 512 learns an affine transform on a per-student-network-output basis (i.e., different shift and scale are used for different student network outputs).

Because the teacher network is assumed to have been trained correctly, the loss function is applied to outputs in the frame of reference of its outputs (i.e., without shifting and/or scaling these outputs). In addition, the teacher network frame of reference is typically the frame of reference of the ground-truth outputs for each of the inputs, as the teacher network would typically have been trained to minimize the difference between its outputs and the ground-truth outputs for the inputs used for its training.

These adjusted student network outputs, as well as the unadjusted teacher network outputs, are provided to the performance loss calculator 510. This performance loss calculator 510 applies a traditional loss function to the adjusted student network outputs and to the unadjusted teacher network outputs and computes a loss function term (referred to herein as the "performance" loss) based on the disparities between these terms for corresponding outputs. The traditional loss function, in some embodiments, compares the generated network output for a given input to the expected (ground-truth) output for that input. For instance, some embodiments use a cross-entropy loss for classification network outputs or other traditional loss functions for other types of outputs.

In some embodiments, like with the disparity loss, the performance loss calculator 510 uses a function that approximates a maximum (e.g., the same function applied to the z-scores by the disparity loss calculator) in order to penalize the student network outputs for which the traditional loss function has the largest divergence from its application to the corresponding teacher network output. Because the traditional loss function is applied for the output as a whole, rather than individual output components, the inputs with the maximum traditional loss disparity may be different than those with the largest individual output component disparity.

The disparity loss and performance loss are both provided to the loss propagator 515, which (i) computes a weighted sum of these two loss function terms based on, e.g., coefficients that are set as hyperparameters and (ii) back-propagates the total computed error for the batch of inputs to determine the rate of change (gradient) of the loss function with respect to a change in each of the network parameters being trained at the current value of the loss function.

The parameter modifier 520 uses these network parameter gradients to modify the parameter values 535 for the next training iteration. Some embodiments use SGD training to modify the parameter values. The process of input selection, forward propagation, loss function calculation, and back-propagation is repeated for multiple batches of inputs 545 in some embodiments.

FIG. 6 conceptually illustrates a process 600 of some embodiments for training a student machine-trained network (e.g., a neural network) based on a previously-trained teacher network (i.e., to perform the same task as the teacher network). The process 600 is performed, in some embodiments, by a training system such as that shown in FIG. 5. It should be noted that the process 600 conceptually illustrates the process performed for one iteration (e.g., one epoch) of the training of the student network. In some embodiments, various aspects of the training will be adjusted (e.g., hyperparameters adjusted, new inputs added to the set of training inputs, etc.) and subsequently another iteration of the process 600 is run.

As shown, the process 600 begins by receiving (at 605) the student and teacher networks as well as a set of available inputs. The student network, in different embodiments, may be a feed-forward network (e.g., a fully-connected or convolutional network), a transformer decoder network, a recurrent network, a regulatory feedback network, a radial basis function network, etc. Similarly, the teacher network may also be of any of these various types of networks. As noted, in some embodiments, the student and teacher networks may be completely different types of networks, though for certain types of tasks the network types that can be trained to perform those tasks is still somewhat limited. For the student network, the network definition specifies the structure of the network, including the number, type, and size of the layers, the number and structure of filters for each convolutional or fully-connected layer, etc. The network definition may also specify initialized values for all of the trainable network parameters (e.g., weights, biases, activation function parameters, etc.), and often varies based on the purpose for which the network will be trained. For instance, a network that classifies an image into one of a set of (e.g., 10) categories will have a different output format (a set of probabilities for each of the categories) than a network that specifies whether or not a face is present or a network that identifies bounding boxes for each face or object in an image, and all of these will differ significantly from the output for a NLP network that outputs an embedding used to select a next token for an input text block.

The set of available inputs (as well as ground truth outputs) depends on the purpose of the network. For instance, image analysis networks will have a variety of different images as inputs, typically aiming for at least some edge cases of various types. For a categorization network, the set of available inputs will often include not only various canonical examples of each category but also images of one category that could easily be mistaken for another category (e.g., an image of a small dog with cat-like features), images that place the item to be categorized on the edge or in the corner, etc. NLP networks will have many different types of text blocks of varying size with different words as inputs.

Next, the process 600 begins by selecting (at 610) a batch of inputs. In some embodiments, each batch of inputs is selected randomly (e.g., with an equal probability) from the set of available inputs. In other embodiments, at least for later training epochs, the inputs are remassed and selected with varying frequency (e.g., so that inputs for which the student network performs worse relative to the teacher network are selected more often).

In some cases, the inputs for NLP networks include subsequent text blocks based on having run the network numerous times (e.g., numerous time steps). That is, one input will be an original text block, the next input is that original text block with an optimal next token appended, and so on for K additional tokens. These inputs, in some embodiments, are treated as a single input group that should be selected and propagated through the network together (along with several other such groups of related inputs).

In traditional network training, random data augmentations are applied to inputs to make things more difficult for the network and thereby improve model generalization. Some embodiments apply these standard augmentations to inputs. Other embodiments instead either (i) add a fixed amount of augmentations per training input to generate an extended input dataset prior to training or (ii) apply random augmentations to outputs of the teacher network. In some embodiments, these random augmentations can be represented by multiplicative Gaussian noise $z^t(d) \rightarrow z^t(d) \times \mathcal{N}(1, \sigma_{aug})$, with $\sigma_{aug} = f\sigma^t$ and $f \sim 0.05$ a small number.

After selecting the inputs, the process 600 propagates (at 615) the selected batch of inputs through both the student and teacher networks in order to generate the corresponding outputs. For each of the two networks, some embodiments propagate each individual input through the entire network separately. Other embodiments actually perform the propagation for each of the two networks in layers (e.g., propagating all of the inputs in a batch through the first layer of the student network, then propagating all of these separate layer outputs through the second layer of the student network, etc.). This latter methodology enables easier computation of batch normalization parameters on a layer-by-layer basis and reduces the amount of times the weights and other parameters are loaded for use by the processor (e.g., GPU) that is executing the network. Some embodiments propagate each individual input through the entire teacher network separately (because the teacher network is not being trained and only the output values are of interest) while propagating the batch of inputs through the student network in layers (as the student network is being trained). In addition, when propagating K time steps worth of text input (i.e., an initial text block, the initial text block with one token appended, the initial text block with two tokens appended, and so on K times), some embodiments propagate all of these input text blocks through the network at the same time (for the reasons discussed above). Depending on the type and structure of the network, each generated output may have one or more output components (logits). In general, the student and teacher network outputs have the same output structures (e.g., the same number of output components).

Next, having generated the outputs for the batch for both the student and teacher networks, the process 600 determines (at 620) the mean and standard deviation for the output components of both the student and teacher networks. That is, some embodiments determine a separate mean and standard deviation for each output component of the teacher and student networks. For instance, for an NLP network that outputs a vector embedding with 768 individual values, the process calculates 768 different means and standard deviations. In some embodiments, the student network means and standard deviations are computed using the outputs generated for the current batch, such that these values change for each batch. Because the network itself changes each iteration, it may not be advisable to accumulate the means and standard deviations across batches. In other embodiments, however, the means and standard deviations of the student network output components are learned parameters of the student network. For the teacher network, which is constant across iterations, the network output mean and standard deviation are either known properties or are based on an accumulation of results over the multiple training iterations.

Using these identified means and standard deviations, the process 600 computes (at 625) z-scores for each student network output and each teacher network output. That is, some embodiments compute a z-score for each component of each output. As noted, some embodiments convert the outputs to an equivalent format for comparison because the student network outputs and teacher network outputs may not be on the same scales or centered at the same values (depending on the type of network, bits available for the outputs, etc.). The z-scores are given by the following equations (subtracting the mean from each output and then dividing by the standard deviation):

$$\hat{z}_{i,d}^{(s)} := \frac{z_{i,d}^{(s)} - \mu_i^{(s)}}{\sigma_i^{(s)}}, \ \hat{z}_{i,d}^{(s)} := \frac{z_{i,d}^{(t)} - \mu_i^{(t)}}{\sigma_i^{(t)}} \qquad (4)$$

In this equation, the $$\hat{z}_{i,d}^{(s)}$$

are the z-scores computed for each student network output component $$z_{i,d}^{(s)}$$

and the $$\hat{z}_{i,d}^{(t)}$$

are the z-scores for each teacher network output $$z_{i,d}^{(t)},$$

where d represents an individual input and the i are the network output components (the logits). The $\mu_i$ are the means and the $\sigma_i$ the standard deviations for each output component (for students and teacher t).

The process 600 then computes (at 630) a disparity loss function term that estimates the maximum disparity between corresponding z-scores for a given input d. Because the existing teacher network is assumed to be trained correctly, for an optimized student network there should not be any disparity between the z-scores of corresponding network outputs (or at least this disparity should be minimized). As such, the disparity loss function measures these differences. Rather than computing an average disparity between student network output and teacher network output z-scores for a batch of inputs, some embodiments use a loss function that focuses the training on the maximum disparities. That is, the loss function penalizes (and therefore seeks to correct) the inputs for which the student network output diverges most from the corresponding teacher network output, once translated into z-scores.

For instance, the simplest piece-wise differentiable function is the Max( ) function, such that a term is defined for each input item d:

$$L_{max}(d) := \max_{i \in 1} [x_{i,d}], \text{ where} \qquad (5)$$

$$x_{i,d} := \left| \hat{z}_{i,d}^{(s)} - \hat{z}_{i,d}^{(t)} \right|^{\gamma_{out}}. \qquad (6)$$

Here, $x_{i,d}$, for each component i of each pair of corresponding outputs generated for input item d, is the disparity between the student network output z-score for d and the teacher network output z-score for d, raised to the power $\gamma_{logit}$. This value $\gamma_{logit}$ is a hyperparameter that may be set manually or trained using a hyperparameter training technique. Some embodiments, rather than using the above Equation (6) for the z-score disparity d, square each of the z-scores before computing the difference. For a batch of inputs B, the disparity loss is given by $$\mathcal{L}_{disp}(B) := \max_{d \in B} [L_{max}(d)^{\gamma_{data}}], \qquad (7)$$

with $\gamma_{data}$ being another hyperparameter. The inner maximum function identifies the maximum disparity between individual output components for a single input d, while the outer maximum function picks out the maximum such disparity over the entire batch B of inputs.

For NLP networks that are expected to operate over multiple time steps (i.e., iteratively operate to add multiple tokens to an input text block), some embodiments use a third dimension of maximum-identification to compute the disparity loss function. Specifically, some embodiments incorporate a time dimension when identifying the maximum disparity. In this case, each input is treated as having numerous (e.g., K) time steps, with the network generating an embedding for a next token each time step (during inference, each embedding is provided to a post-processor that uses the embedding to select a specific next token, which is appended to the input and that entire new input is re-input to the network). In this case, some embodiments calculate the disparity loss as $$\mathcal{L}_{disp}(B) := \max_{d \in B} [\max_{k \in K} [L_{max}(d)^{\gamma_{data}}]], \qquad (8)$$

Here, the inner maximum function identifies the maximum disparity between individual output components for a single input d, the middle maximum function identifies the maximum such disparity over K time steps for a single input group, and the outer maximum function picks out the maximum such disparity over the entire batch B of inputs. For a network that does not use inputs/outputs with time steps (e.g., an image processing network), K=1 and this Equation (8) collapses into Equation (7).

That is, the outputs of each of the two networks (student and teacher) are organized as a three-dimensional tensor. Each individual input generates an embedding vector with Z (e.g., a 768-component vector), and these are organized as K vectors for an input group. In addition, there are B text blocks, each of which have up to K separate text inputs (in some cases, there may be different numbers of time steps for different text blocks). Thus, the overall output is a Z×K×B tensor, and the nested set of maximum functions identifies the maximum disparity between the teacher and student outputs. While a single maximum function could be used across all three dimensions, as described below, some embodiments use continuously-differentiable approximations of the maximum function. Nesting these, rather than using a single maximum, allows for different hyperparameters to be used for each dimension.

As noted, other options for the disparity loss are continuously-differentiable functions that approximate the maximum function. For instance, the parametrized log-sum-exponent (LSE) function is given by:

$$LSE_{\lambda_{logit}}(d) := \frac{1}{\lambda_{logit}}\log\sum_{i\in I}\exp[\lambda_{logit}x_{i,d}],\tag{9}$$

in which case the disparity loss term is defined as:

$$\mathcal{L}_{disp}(B) := \frac{1}{\lambda_{data}}\log\sum_{d\in B}\exp\left[\lambda_{data}LSE_{\lambda_{logit}}(d)^{\gamma_{data}}\right].\tag{10}$$

This formulation adds the additional hyperparameters $\lambda_{logit}$ and $\lambda_{data}$ that parametrize the respective LSE functions, controlling how much emphasis should be put on the largest disparities.

Another continuously-differentiable option for approximating the maximum function uses the p-norm, with p>>1 (although this is a valid loss function for any p). This function employing the p-norm is given by:

$$Lp_{\lambda_{logit}}(d) := \left(\frac{1}{1}\sum_{i\in I}\left|\hat{z}_{i,d}^{(s)} - \hat{z}_{i,d}^{(t)}\right|^{\gamma_{logit}}\right)^{\lambda_{logit}},\tag{11}$$

in which case the disparity loss term is defined as:

$$\mathcal{L}_{disp}(B) := \left(\frac{1}{|B|}\sum_{d\in B}\left|Lp_{\lambda_{logit}}(d)\right|^{\gamma_{data}}\right)^{\lambda_{data}}.\tag{11}$$

Yet another continuously-differentiable option for approximating the maximum in the limit of λ>>1 is a Boltzmann expected energy function. This function takes the form:

$$U_{\lambda_{logit}}(d) := \frac{\sum_{d}x_{i,d}e^{\lambda_{logit}x_{i,d}}}{\sum_{j}e^{\lambda_{logit}x_{j,d}}},\tag{13}$$

in which case the disparity loss term is defined as:

$$\mathcal{L}_{KD}(B) := \frac{\sum_{d}u(d)e^{\lambda_{data}u(d)}}{\sum_{j}e^{\lambda_{data}u(d)}}.\tag{14}$$

Here, $u(d) := U(d)^{\gamma_{data}}$.

Figure 7:
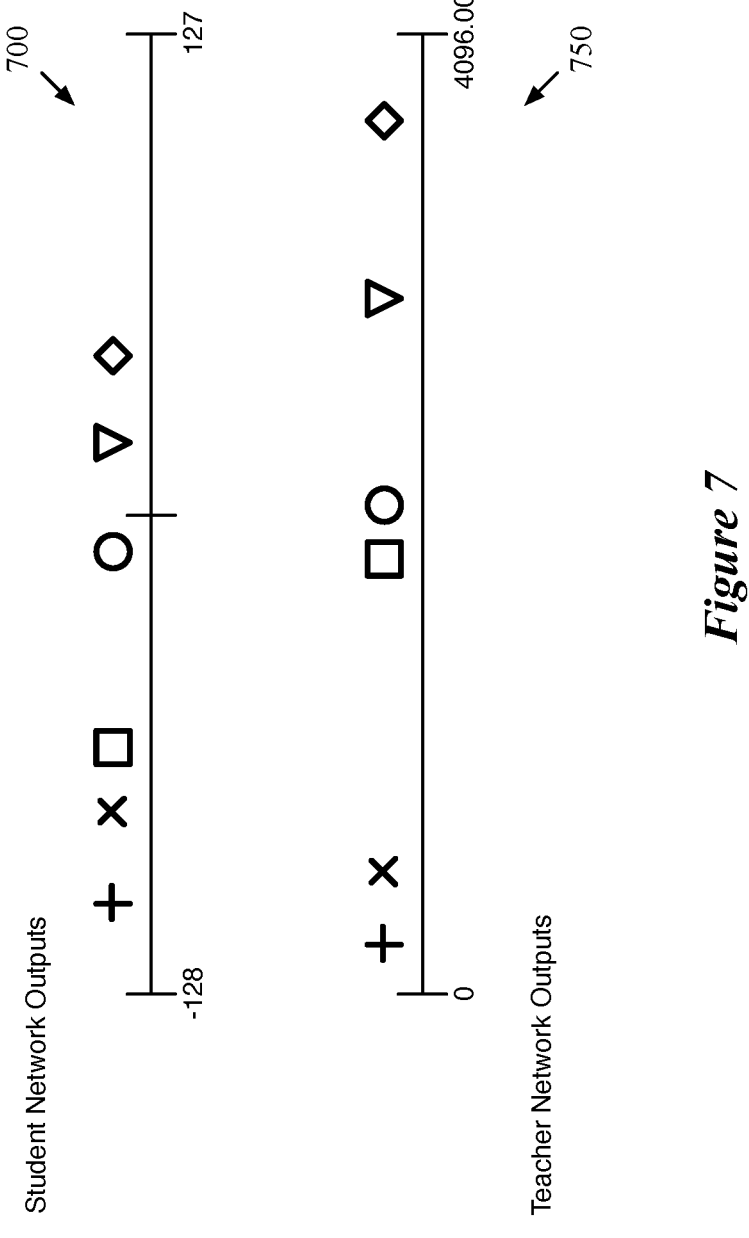
FIG. 7 conceptually illustrates a set of student network outputs and corresponding teacher network outputs for a batch of inputs.

FIG. 7 conceptually illustrates a set of student network outputs 700 and corresponding teacher network outputs 750 for a batch of six inputs. It should be understood that a typical minibatch will have a larger number of inputs and that the limited number of inputs in the example is only for illustrative purposes. In addition, the outputs shown in this figure may either be a single component of a multi-component (multi-logi) output or the outputs only include a single component. In this figure, each student network output is represented by a different symbol and its corresponding teacher network output (generated for the same input) is represented by the same symbol. The student network outputs are quantized to signed 8 bits (S8.0), and thus can have an integer value from −128 to 127. The teacher network outputs are floating point values that generally range from 0 to 4096 (but can also include decimal values).

Figure 8:
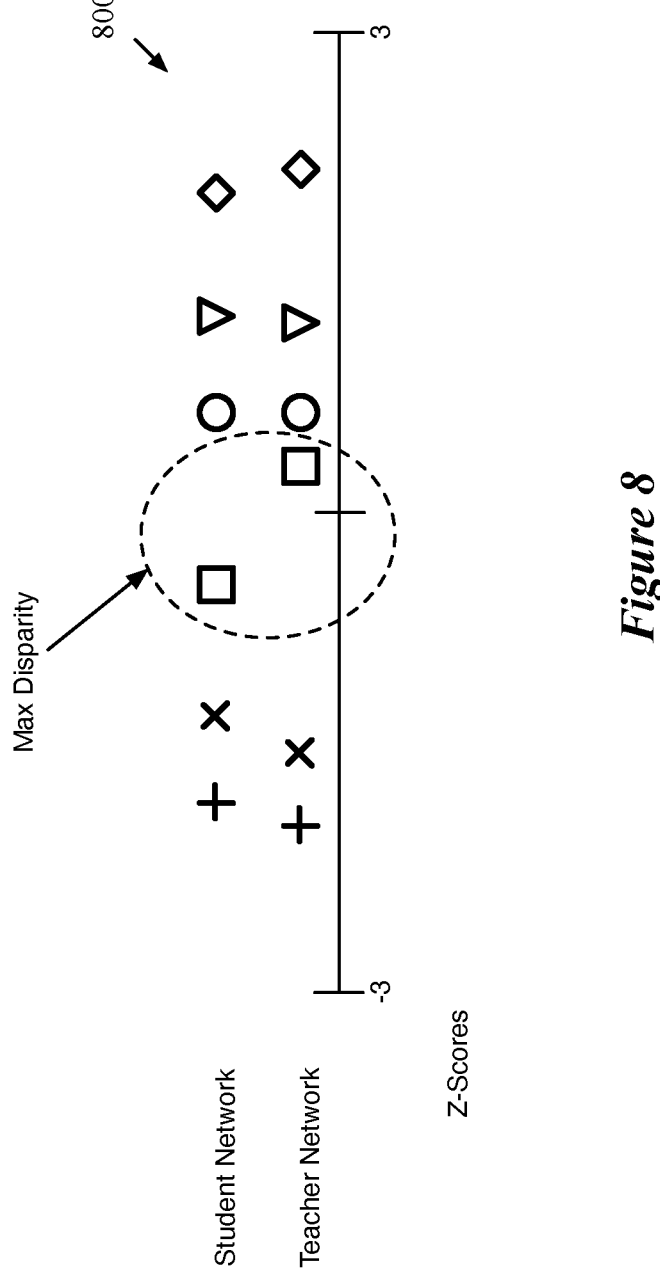
FIG. 8 conceptually illustrates the translation of the outputs shown in FIG. 7 into z-scores.

FIG. 8 conceptually illustrates the translation of these outputs into z-scores. In this case, the student network output z-scores and teacher network output z-scores can be plotted on the same graph 800. In both cases, the z-scores are centered around 0, and range from approximately −2 to 2. In addition, because the z-scores serve as an equivalent format for both of the output sets, corresponding student and teacher network outputs for the most part have similar values. As shown in the figure, the outputs represented by a square have the maximum disparity in their z-scores, and therefore the disparity loss function will pick out this disparity for correction in the subsequent parameter adjustment.

Returning to FIG. 6, the process then converts (at 635) the student network outputs to the frame of reference of the teacher network with an affine transform. As described above, this enables the proper application of a traditional loss function to both the student network outputs and the teacher network outputs for comparison. In some embodiments, the training system performs this translation by, for each output component, subtracting the student network output component mean and dividing by the student network output component standard deviation, then multiplying by the teacher network output component standard deviation and adding the teacher network output component mean to each student network output. This can be expressed as $$\hat{z}_{i,d}^{(s)} = \mu_i^{(t)} + \sigma_i^{(t)}z_{i,d}^{(s)},\tag{15}$$

where $$z_{i,d}^{(s)}$$

is the transformed student network output. In some embodiments, rather than strictly using the teacher network output component standard deviations and means, the training system learns an affine transform on a per-component basis (i.e., with different shifts and scales used for different student network output components). In this case, the transformed student network outputs are expressed as $$z_{i,d}^{(s)} = \mu_i^{learned} + \sigma_i^{learned} \hat{z}_{i,d}^{(s)}$$ (16)

Using these converted student network outputs, the process 600 computes (at 640) a performance loss that estimates the maximum difference between the application of a traditional loss function to a converted student network output and its corresponding teacher network output. The traditional loss function is a standard measure of the distance between a ground-truth output and the network-generated output. For instance, cross-entropy loss may be used for classification networks, absolute error or squared error for networks that output a value or set of values, etc.

If using the piece-wise differentiable Max( ) function, the performance loss is given by:

$$\mathcal{L}_{\delta L_{perf}}(B) := \alpha \max_d [\gamma(d)], \text{ where}$$ (17)

$$\gamma(d) := \left| L_{perf}^{(t)}(d) - L_{perf}^{(s)}(d) \right|^{\gamma_{perf}}.$$ (18)

In this formulation, $L_{perf}$ is the traditional loss function (e.g., cross-entropy, etc.) which is applied to the outputs of the teacher network and student network (after conversion to the teacher network output reference frame). In addition, $\alpha$ and $\gamma_{perf}$ are hyperparameters (a is a weighting coefficient in some embodiments used to weight the performance loss relative to the disparity loss).

For NLP networks, as mentioned, in some embodiments the inputs are treated as having numerous (K) time steps, with the network generating an embedding for a next token each time step. These embeddings (the network outputs), as generated by the network, can be viewed as encoded probability distributions for the next token. To compute the performance loss for the embeddings at each time step, some embodiments integrate over the probability distributions (e.g., by integrating across the components of the embedding).

As with the disparity loss, continuously-differentiable functions that approximate the maximum function are also used in some embodiments. These include the parametrized LSE function:

$$\mathcal{L}_{\delta L_{perf}}(B) := \frac{\alpha}{\lambda_{perf}} \log \sum_{d \in B} \exp[\lambda_{perf} y(d)],$$ (19)

a function employing the p-norm:

$$\mathcal{L}_{\delta L_{perf}}(B) := \alpha \left( \frac{1}{|B|} \sum \left| L_{perf}^{(t)}(d) - L_{perf}^{(s)}(d) \right|^{\gamma_{perf}} \right)^{\lambda_{perf}},$$ (20)

and the Boltzmann expected energy function:

$$\mathcal{L}_{\delta L_{perf}}(B) := \alpha \frac{\sum_d y(d) e^{\lambda_{perf} y(d)}}{\sum_j e^{\lambda_{perf} y(d)}}.$$ (21)

These formulations introduce an additional hyperparameter, $\lambda_{perf}$, that parametrizes the functions.

With both loss terms calculated, the process 600 computes (at 640) the total loss as a weighted sum of the disparity loss and the performance loss. That is, the loss function that is the objective to be minimized by training is:

$$\mathcal{L}_{Tot}(B) = \mathcal{L}_{KD}(B) + \mathcal{L}_{\delta L_{perf}}(B).$$ (22)

The weight, in this formulation, is given by the hyperparameter $\alpha$, which typically is a number smaller than 1 (giving more weight to the disparity loss as compared to the performance loss).

Finally, for the current batch, the process 600 backpropagates (at 655) the total loss function values through the student network to determine gradients for each network parameter and modifies the network parameters based on the gradients. These parameters include the weights, biases, etc. of the student network. The teacher network is not adjusted during this process, only the student network, as the teacher is assumed to be trained properly.

With the current batch complete (i.e., forward propagation and back-propagation finished for the batch), the process 600 determines (at 660) whether the current training is complete. As described above, the process 600 might be run multiple times for different training epochs (e.g., with hyperparameter adjustment or other operations performed between epochs). If the training is complete, the process 600 ends. Otherwise, the process returns to 610 to select another batch of inputs from the available inputs (some embodiments also remass the inputs prior to selection, either after each batch or after a number of batches).

As mentioned, in some embodiments the student network is trained to meet specific parameters (quantization/ternarization and sparsity of weights, quantization of intermediate values and outputs) so that the network can be executed on a specific type of neural network inference circuit with these ternarization and sparsity requirements. Such a neural network inference circuit is part of an integrated circuit in some embodiments. The ICs of some embodiments are configurable to implement different networks trained to perform a particular function. For instance, the ICs may implement networks for object or facial recognition in images, voice recognition in audio samples, natural language processing, etc. For instance, for detail on such an IC being configured to execute the attention mechanisms required for transformer decoder networks, see U.S. patent application Ser. No. 17/543,446, which is incorporated herein by reference.

Figure 9:
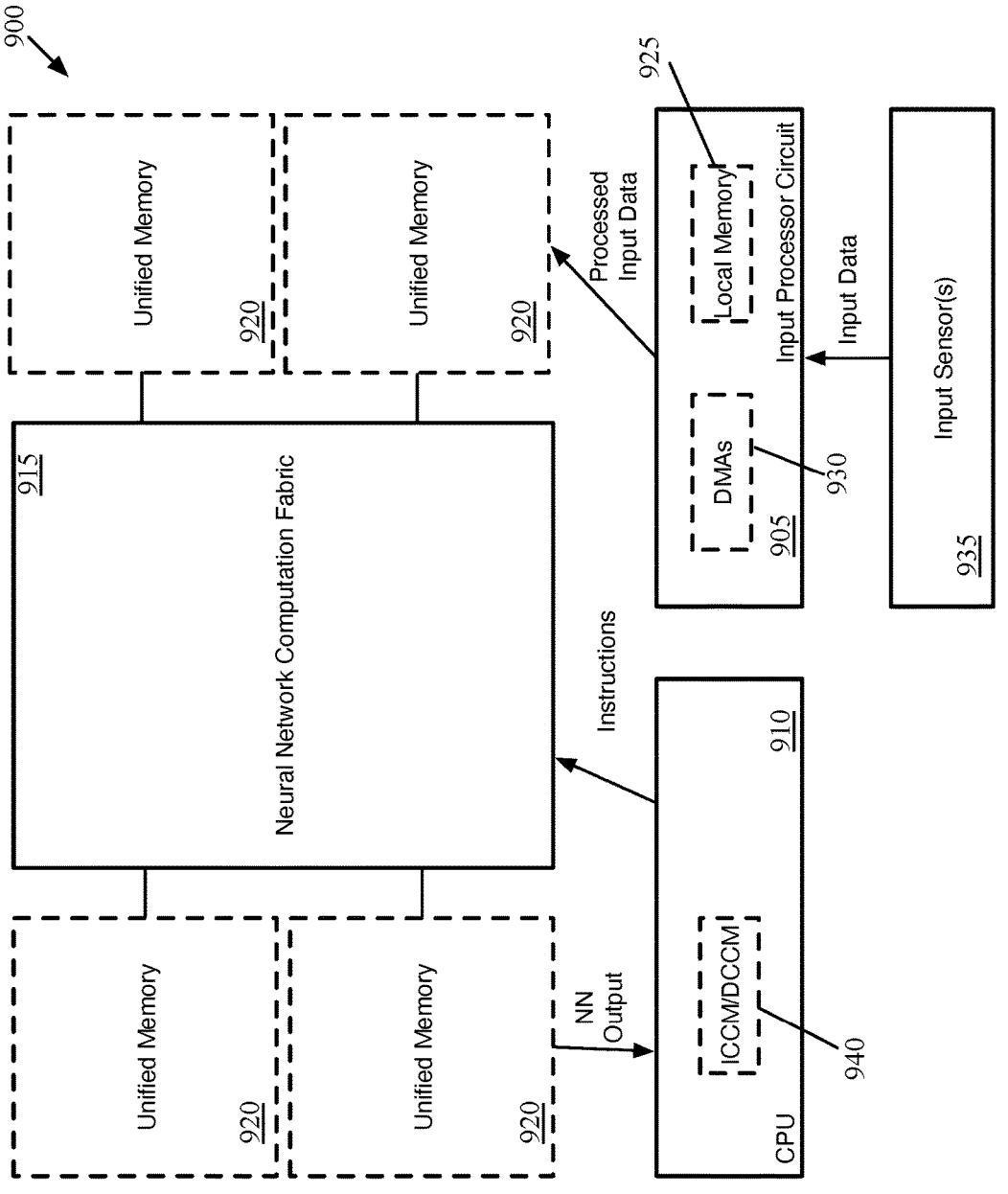
FIG. 9 conceptually illustrates an integrated circuit of some embodiments.

The IC of some embodiments includes a set of input processing circuits, a neural network computation fabric that can be configured to apply a neural network to an input, and a microprocessor (e.g., for controlling the input processing circuits and configuring the neural network computation fabric). FIG. 9 conceptually illustrates such an IC 900 of some embodiments. As shown, the IC includes an input processor circuit 905, a microprocessor (CPU) 910, a neural network computation fabric 915, and a set of unified memory 920. In addition, the input processor circuit 905 includes local memories 925 (e.g., a small amount of memory for input processing instructions) and direct memory accesses 930 (which enable the input processing circuit 905 to access the unified memory 920 without CPU involvement). The CPU 910 includes closely coupled memory 940 for instruction (ICCM) and data (DCCM) which can be used for booting up the IC (e.g., boot loaders and/or firmware are loaded out of ROM (not shown) into the ICCM and/or DCCM, as well as typical components for accessing the unified memory.

The unified memory 920, as mentioned, is shared by the CPU 910, the input processor circuit 905, and the neural network computation fabric 915. This unified memory 920 is shown in four blocks in this figure; in some embodiments the neural network computation fabric includes multiple cores that each access their own respective portions of the unified memory. It should also be noted that, in other embodiments, each of the cores includes its own memory separate from the unified memory. In some embodiments, the unified memory 920 is made up of banks of SRAMs. In addition, the unified memory includes multiple interfaces for the different circuits 905-915 to access the memory for read/write operations. In some embodiments, the unified memory includes direct access ports for the cores of the computation fabric 915 to access their associated memory banks, as well as a separate interface for enabling the CPU 910 and input processor circuit 905 to access all of the memory banks.

In some embodiments, the IC is integrated into a device (such as an Internet of Things (IOT) device) with one or more input sensors 935. These input sensors can include cameras (e.g., for capturing video images on which the neural network computation fabric 915 performs face or object recognition, etc.), microphones (e.g., for capturing audio on which the neural network computation fabric 915 performs voice recognition, speech processing, etc.), or other types of input sensors. In other embodiments, the input sensors 935 are located on a separate device that is linked with the IC 900.

In some embodiments, at bootup of the IC 900, the firmware loads a neural network program object. This causes the CPU 910 to load neural network configuration data (e.g., weight values, scale and bias parameters, lookup table masks for each layer, memory locations for the weight and input values to use for computing each layer of the network, etc.) from off-chip storage and to store weight values and instruction arguments to the unified memory 920. In different embodiments, the weight values and/or instruction arguments may be stored in the unified memory 920 by the CPU 910 directly or by the CPU 910 generating instructions for the neural network computation fabric 915 to write this data (the weight values and/or instruction arguments) to the unified memory 920. Some embodiments, rather than storing instruction arguments in the unified memory 920, instead use a specific memory local to the computation fabric 915 to store instruction arguments. However, the benefit of using the unified memory 920 for this purpose is that doing so allows for larger networks (e.g., with more layers that would require more instruction arguments).

In addition, the CPU 910 loads the neural network program instructions for the computation fabric to its own memory 925. These instructions are applied by the computation fabric 915 to input data in order to execute the neural network. These runtime instructions include, e.g., indications as to which pre-loaded sets of instruction arguments 945 to use for each set of calculations (affine transforms, activation functions, etc.).

The input processor circuit 905 receives input data (e.g., still images or video frames, sounds, etc.) from the input sensor(s) 935, and processes these according to processing instructions received from the CPU 910 or stored in local memory 925. These instructions identify, in some embodiments, any sort of initial processing to apply to the raw data (e.g., decompression of compressed data, etc.), if any, as well as how to store the input data in the unified memory 920 to be read by the computation fabric 915. Because the input processor circuit 905 and the computation fabric 915 share the unified memory 920, the input data does not need to be copied from one circuit's local memory to another. Instead, the input processor circuit 905 stores an input once into the unified memory 920 and the computation fabric 915 reads the input from the same location in the unified memory 920. For an image, e.g., the storage instructions might specify the specific location that pixel values (e.g., RGB values) should be arranged and stored in the unified memory 920. The input processor circuit 905 also sends signals to the CPU 910 to indicate when it has fully buffered an input (e.g., a frame of video) so that the input can be read by the computation fabric 915.

In addition to instructing the input processor circuit 905 how and when to store input data for use by the computation fabric 915, the CPU 910 provides the neural network program instructions to the computation fabric. In some embodiments the CPU 910 provides these instructions in stages (e.g., one layer or portion of a layer at a time). Once the final output of the neural network is computed, the fabric 915 stores this output in the unified memory 920, so that the CPU can perform post-processing operations on the output (e.g., evaluate the output and perform any actions based on the output). In some embodiments, because the outputs of the student network (i.e., the network executed by the IC 900) during training are transformed into the frame of reference of the teacher network outputs, this same affine transform (e.g., from a quantized value into a floating-point value) should be performed on the outputs during inference. Because this transform results in a floating-point number, some embodiments perform the transform on the CPU 910 rather than the fabric 915 (which only handles quantized values).

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer and/or filter of the network), and/or that at least a particular percentage of the weight values be equal to zero.

Figure 10:
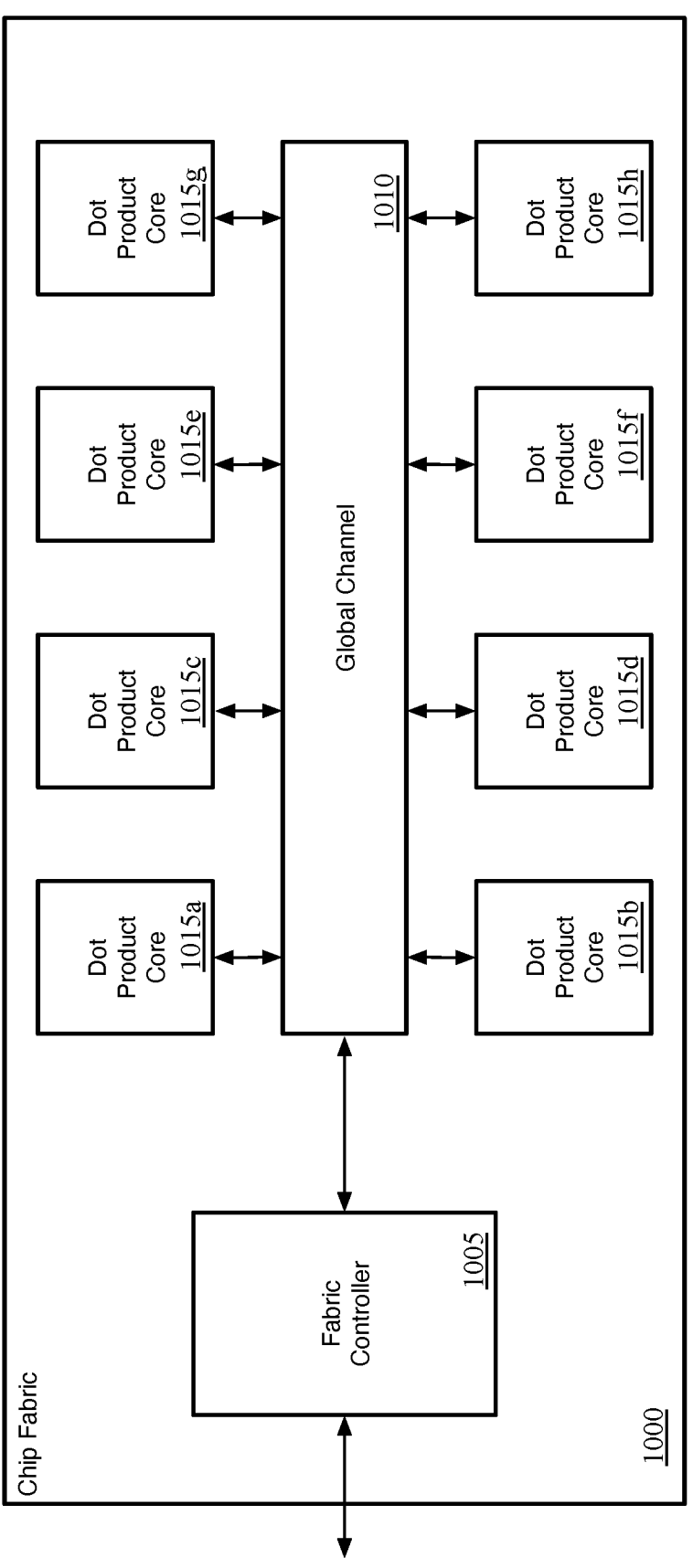
FIG. 10 conceptually illustrates the neural network computation fabric of some embodiments.

FIG. 10 conceptually illustrates the neural network computation fabric 1000 (also referred to as the neural network inference circuit, chip fabric, or neural network accelerator) of some embodiments. The chip fabric 1000 of some embodiments includes a fabric controller 1005, a global channel 1010, and a set of dot product cores 1015*a-h*. The connections between the various components 1005-1015 represent the flow of both control data (e.g., configuration data for a particular neural network layer) and computation data at runtime in some embodiments.

The fabric controller 1005 is responsible for managing the operation of the rest of the chip fabric 1000 (e.g., the dot product cores 1015) in some embodiments. The fabric controller 1005 loads instruction arguments (e.g., weight and activation value locations, which cores to use for a particular computation, etc.) from the unified memory (or a local memory on the chip) based on instructions received from the CPU, maps instructions into a sequence of memory-mapped register writes, synchronizes the downstream controllers (e.g., controllers for the various cores 1015), etc. The instructions managed by the fabric controller 1005 are configured at compile time, in some embodiments, based on the parameters of the network being implemented by the chip fabric 1000. In some embodiments, the fabric controller 1005 interacts with the microprocessor of the IC as well (i.e., the fabric controller 1005 handles the communication with the CPU 910 shown in FIG. 9). During execution of the neural network in some embodiments, the fabric controller 1005 receives instructions as opcodes along with pointers to the location in the unified memory (or local memory) of the arguments for that opcode. The fabric controller retrieves these arguments in order to determine the full instruction. Because some instructions can have dozens of arguments and the same instructions are sent each time the network is executed for a new input (e.g., many times per second), storing the arguments locally (rather than the CPU sending the arguments with each instruction) saves processing power and system bus bandwidth.

The chip fabric also includes numerous dot product cores 1015a-h as well as a global channel 1010 that connects the cores, with these data processing circuits configured by the fabric controller (and a set of hierarchical control circuits, in some embodiments). These data processing circuits 1010 and 1015 operate to compute neural network operations in an efficient, low-power manner, according to the configuration data provided by the control circuits.

The dot product cores 1015a-h include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs. The core memory, controllers, adder trees, and other core circuitry of some embodiments are described below in greater detail.

The global channel 1010 is responsible for providing a communications bus for control and computation data between the fabric controller 1005 and the cores 1015, as well as from one core to another. The global channel 1010, among other operations, accumulates partial dot products from multiple cores when computing dot products that require more computations than can be performed in a single core, and performs post-processing on these dot products (including application of decoding and encoding affine transforms). The global channel also performs certain non-dot product operations, such as element-wise and pooling operations.

In addition, the global channel 1010 carries activations (i.e., computation node outputs) after post-processing for storage (and for use as inputs to subsequent computation nodes) in other cores 1015. In some embodiments, the global channel 1010 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 1010, as described further below.

The chip fabric 1000 of some embodiments computes numerous neural network computation nodes simultaneously, with the computation for one node often spread across multiple cores (and subsequently the global channel). In some cases, if a neural network layer is small enough, then computation for that layer may be confined to a single core 1015. However, if multiple cores are used for a given layer (any number of cores may be used in some embodiments), then each dot product computed for that layer is spread across all of the cores 1015 in use.

That is, for a dot product computed across more than one core 1015, each of these cores computes a partial dot product from a subset of the input values and weight values for the node, then provides these partial dot products to the global channel 1010. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 1010. In some cases, however (e.g., for dot products with a very large number of terms or using larger than standard activation values, or when filters have too many nonzero weight values), each core 1015 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 1010 aggregates these partial dot products to compute the complete dot product for each node, then applies various post-processing functions (e.g., the bias, weight scale, decoding and encoding affine transforms, and activation functions) to compute the output of each node. Some embodiments also apply affine transforms activation functions to the results of the pooling and/or element-wise operations.

In some embodiments, the dot product cores are grouped into clusters, and the global channel includes separate segments for each such cluster. Each of these channel segments includes the same circuitry in some embodiments, with the exception that buses in the first and last channel segments only connect to corresponding buses in one other channel segment while the buses in the intermediate channel segments connect to corresponding buses in two neighboring channel segments. Additional details of the integrated circuit and neural network computation fabric specifically can be found in U.S. Pat. No. 11,049,013 and U.S. patent application Ser. No. 17/306,744, both of which are incorporated herein by reference.

Figure 11:
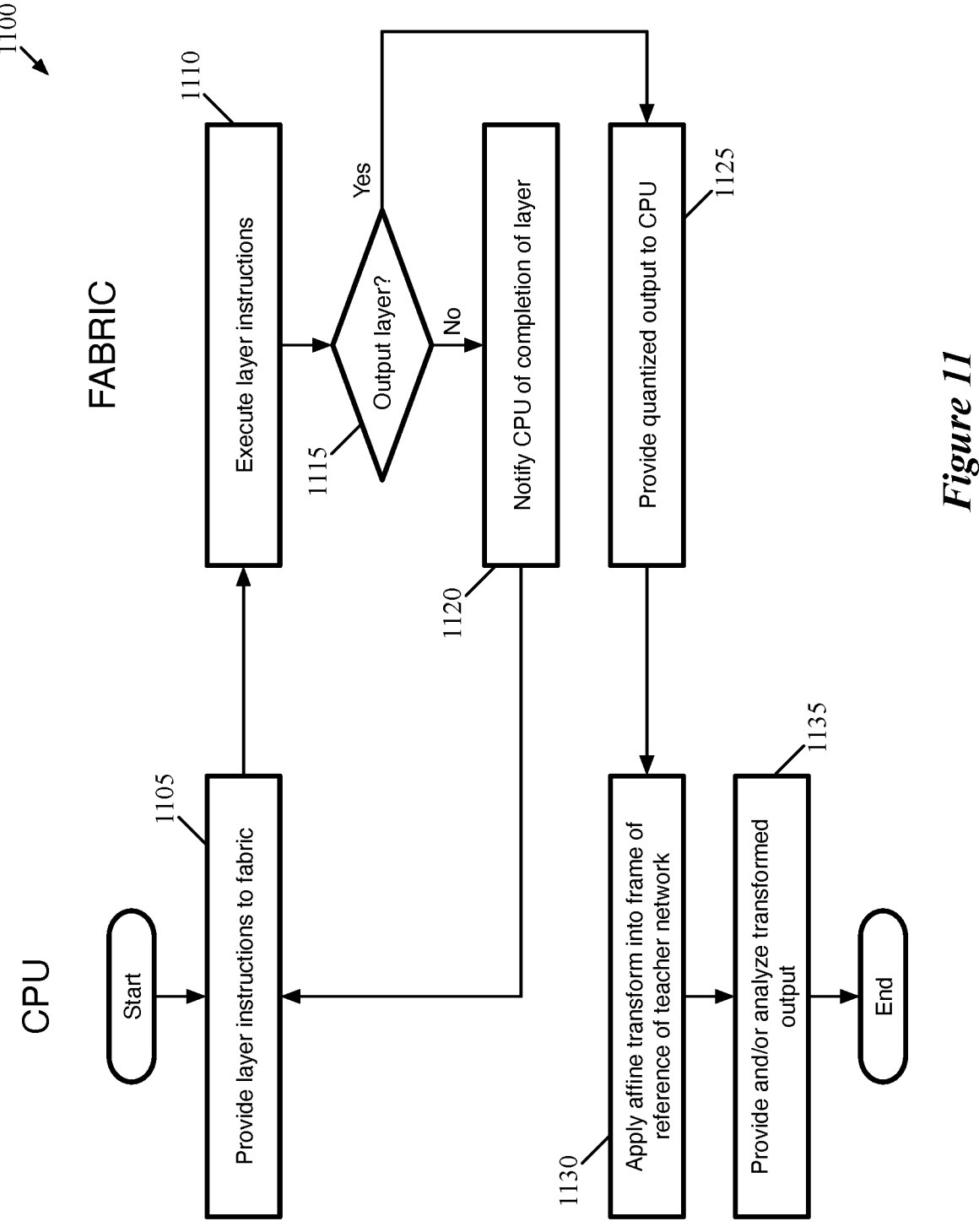
FIG. 11 conceptually illustrates a process for executing a trained neural network during inference on the integrated circuit of some embodiments.

FIG. 11 conceptually illustrates a process 1100 for executing a trained neural network during inference on the integrated circuit of some embodiments (e.g., that shown in FIG. 9). In some embodiments, the network is trained as described above, with quantized outputs from a student network (the network now being executed on the integrated circuit) translated into a teacher network frame of reference. Because this transform is applied during training, it should also be applied during inference. As shown, operations of the process 1100 are divided between the CPU (e.g., CPU 910) and the neural network computation fabric (e.g., fabric 915). It should be noted that this process assumes that the fabric (or unified memory to which the fabric has access) has received the input data from the input processing circuit (or from the CPU, in other embodiments).

As shown, the process 1100 begins by the CPU providing (at 1105) layer instructions to the fabric. As mentioned, the fabric would have already received (or have access to, in the unified memory) input data for which the network is to be executed. This input may be a frame of streaming video, a still image, an audio clip, etc., depending on the task performed by the network. As described, in some embodiments the CPU provides these instructions to the fabric (i.e., to a fabric controller) as opcodes along with pointers to the location in the unified memory (or local memory) of the arguments for that opcode.

Next, the fabric executes (at 1110) these layer instructions. In some embodiments, the fabric controller retrieves the instruction arguments and instructs various cores and other circuit blocks of the fabric to execute these instructions. In some embodiments, the layer instructions specify the type of layer (convolutional, element-wise multiplication or addition, max or average pooling, etc.), the location in memory from which input is received, which cores will perform the operations, and to which locations in memory the layer output activations will be stored. For instance, for convolutional layers, the specified cores compute partial dot products which are aggregated by an aggregation bus and provided to post-processing circuits which apply affine transforms and a non-linear activation function for each node of the layer. In addition, in some embodiments a layer is large enough (e.g., because there is a large number of filters) that the layer is split across multiple passes, each of which requires separate layer instructions after completion of a previous pass.

The process 1100 then determines (at 1115) whether the just-executed layer is the output layer (i.e., the last layer of the neural network, which generates an output value). If the layer is not the output layer (i.e., additional layers remain in the network), then the fabric notifies (at 1120) the CPU of completion of the layer and the process 1100 returns to operation 1105. In some embodiments, each cluster notifies the fabric controller upon completion of its operations for the layer, and once all of these operations are complete (i.e., all of the intermediate activation values are stored in their proper locations within the memory), the fabric controller can notify the CPU that the layer has been completed, so that the CPU can provide the next set of layer instructions to the fabric. It should be noted that the process 1100 shown in this figure is a conceptual process, and in some embodiments the fabric does not necessarily make an explicit decision as to whether each layer is an output layer or not. Rather, for intermediate layers, the fabric controller operation is to notify the CPU upon completion.

If the most recently executed layer is the output layer, the fabric provides (at 1125) the quantized output to the CPU. In some embodiments, the fabric controller also notifies the CPU of the completion of the layer, which the CPU is aware is the last layer and therefore knows to retrieve the output value. In some embodiments, the fabric actually writes the output value(s) to a specific location in the unified memory, which the CPU retrieves after receiving the completion notification from the fabric controller.

Because the network being executed by the IC was trained based off of another network and its quantized outputs were transformed into the frame of reference of the other network during training, this same set of transforms should be applied during inference. As described above, in some embodiments different transforms are applied to the different output components. As noted, however, if this transform involves floating point values, the fabric of some embodiments is unable to apply the transform.

As such, the CPU applies (at 1130) the affine transforms to the output to transform each component of that output into the reference frame of the teacher network. In some embodiments, the affine transforms each involve a scaling factor (multiplication) and/or a shift factor (addition). The CPU then provides and/or analyzes (at 1135) this transformed output. In some embodiments, analysis of the outputs (e.g., performing actions based on a detected object in an image or video, taking actions based on natural language processing, etc.) is executed by the CPU of the IC. In other embodiments, the CPU provides this information (e.g., if an object is detected, or under other specific conditions) to another circuit (e.g., a larger processor on the same device or on a completely different device) for actions to be taken.

The neural network inference circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the neural network inference circuit to be executed on the device. These devices can include mobile devices, desktop computers, Internet of Things (IoT devices), etc.

Figure 12:
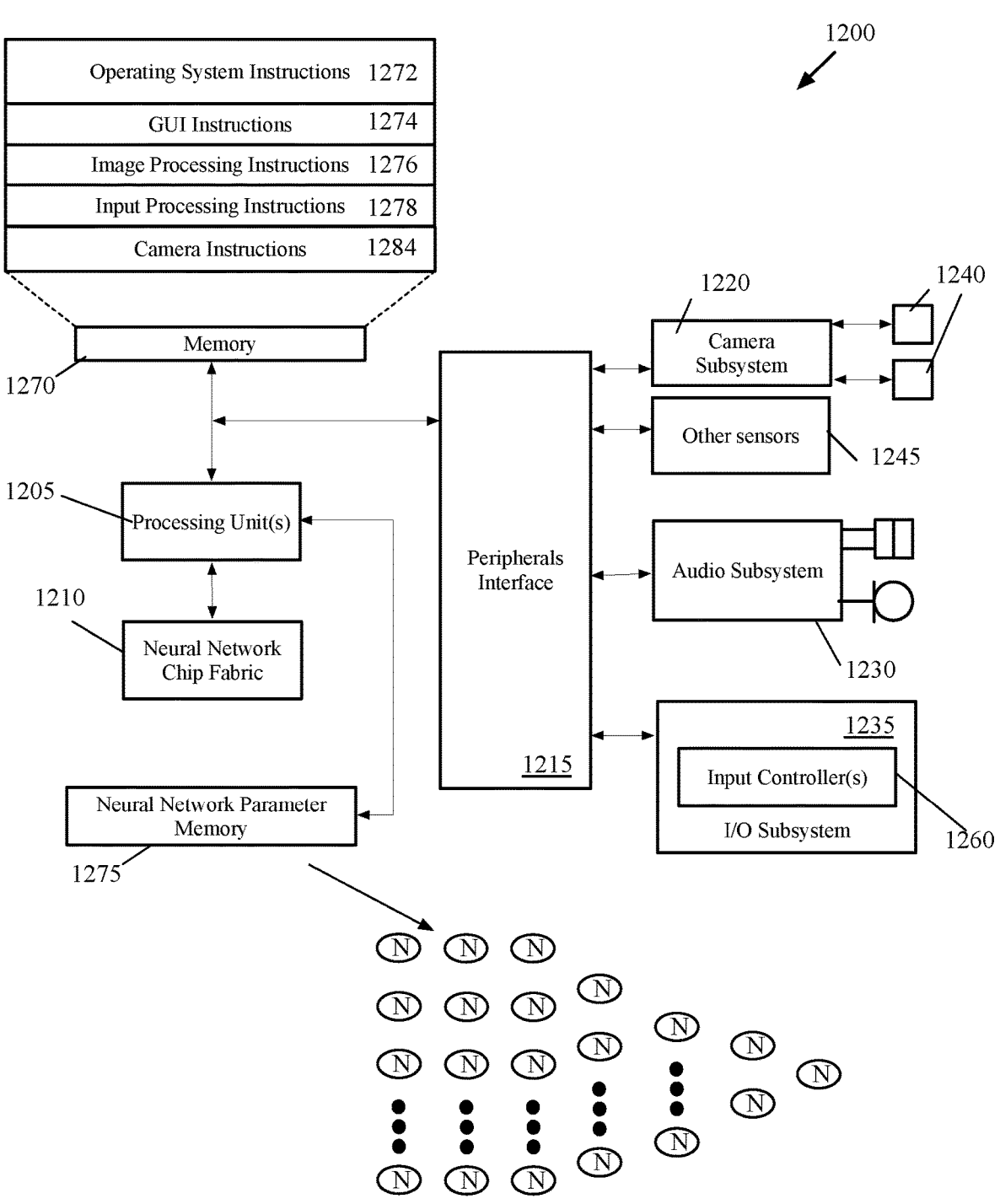
FIG. 12 illustrates an example of the architecture of a mobile computing device that stores neural network processing instructions.

FIG. 12 is an example of an architecture 1200 of an electronic device that includes a neural network integrated circuit of some embodiments. The electronic device may be a mobile computing device such as a smartphone, tablet, laptop, etc., or may be another type of device (e.g., an IoT device, a personal home assistant). As shown, the device 1200 includes one or more general-purpose processing units 1205, a neural network chip fabric 1210, and a peripherals interface 1215.

The peripherals interface 1215 is coupled to various sensors and subsystems, including a camera subsystem 1220, an audio subsystem 1230, an I/O subsystem 1235, and other sensors 1245 (e.g., motion/acceleration sensors), etc. The peripherals interface 1215 enables communication between the processing units 1205 and various peripherals. For example, an orientation sensor (e.g., a gyroscope) and an acceleration sensor (e.g., an accelerometer) can be coupled to the peripherals interface 1215 to facilitate orientation and acceleration functions. The camera subsystem 1220 is coupled to one or more optical sensors 1240 (e.g., charged coupled device (CCD) optical sensors, complementary metal-oxide-semiconductor (CMOS) optical sensors, etc.). The camera subsystem 1220 and the optical sensors 1240 facilitate camera functions, such as image and/or video data capturing.

The audio subsystem 1230 couples with a speaker to output audio (e.g., to output voice navigation instructions). Additionally, the audio subsystem 1230 is coupled to a microphone to facilitate voice-enabled functions, such as voice recognition, digital recording, etc. The I/O subsystem 1235 involves the transfer between input/output peripheral devices, such as a display, a touch screen, etc., and the data bus of the processing units 1205 through the peripherals interface 1215. The I/O subsystem 1235 includes various input controllers 1260 to facilitate the transfer between input/output peripheral devices and the data bus of the processing units 1205. These input controllers 1260 couple to various input/control devices, such as one or more buttons, a touchscreen, etc.

In some embodiments, the device includes a wireless communication subsystem (not shown in FIG. 12) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 12, a memory 1270 (or set of various physical storages) stores an operating system (OS) 1272. The OS 1272 includes instructions for handling basic system services and for performing hardware dependent tasks. The memory 1270 also stores various sets of instructions, including (1) graphical user interface instructions 1274 to facilitate graphic user interface processing; (2) image processing instructions 1276 to facilitate image-related processing and functions; (3) input processing instructions 1278 to facilitate input-related (e.g., touch input) processes and functions; and (4) camera instructions 1284 to facilitate camera-related processes and functions. The processing units 1205 execute the instructions stored in the memory 1270 in some embodiments.

The memory 1270 may represent multiple different storages available on the device 1200. In some embodiments, the memory 1270 includes volatile memory (e.g., high-speed random access memory), non-volatile memory (e.g., flash memory), a combination of volatile and non-volatile memory, and/or any other type of memory.

The instructions described above are merely exemplary and the memory 1270 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 1275 stores the weight values, bias parameters, etc. for implementing one or more machine-trained networks by the neural network chip fabric 1210. In some embodiments, different clusters of the fabric 1210 can implement different machine-trained networks in parallel in some embodiments. In different embodiments, these neural network parameters are stored on-chip (i.e., in memory that is part of the neural network chip fabric 1210) or loaded onto the chip fabric 1210 from the neural network parameter memory 1275 via the processing unit(s) 1205.

While the components illustrated in FIG. 12 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 1205 and the neural network chip fabric 1210, which enables the processing units 1205 to provide inputs to the chip fabric 1210 and receive the outputs of the network from the chip fabric 1210. Also, while many of the functions have been described as being performed by one component, one of ordinary skill in the art will realize that the functions described with respect to FIG. 12 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
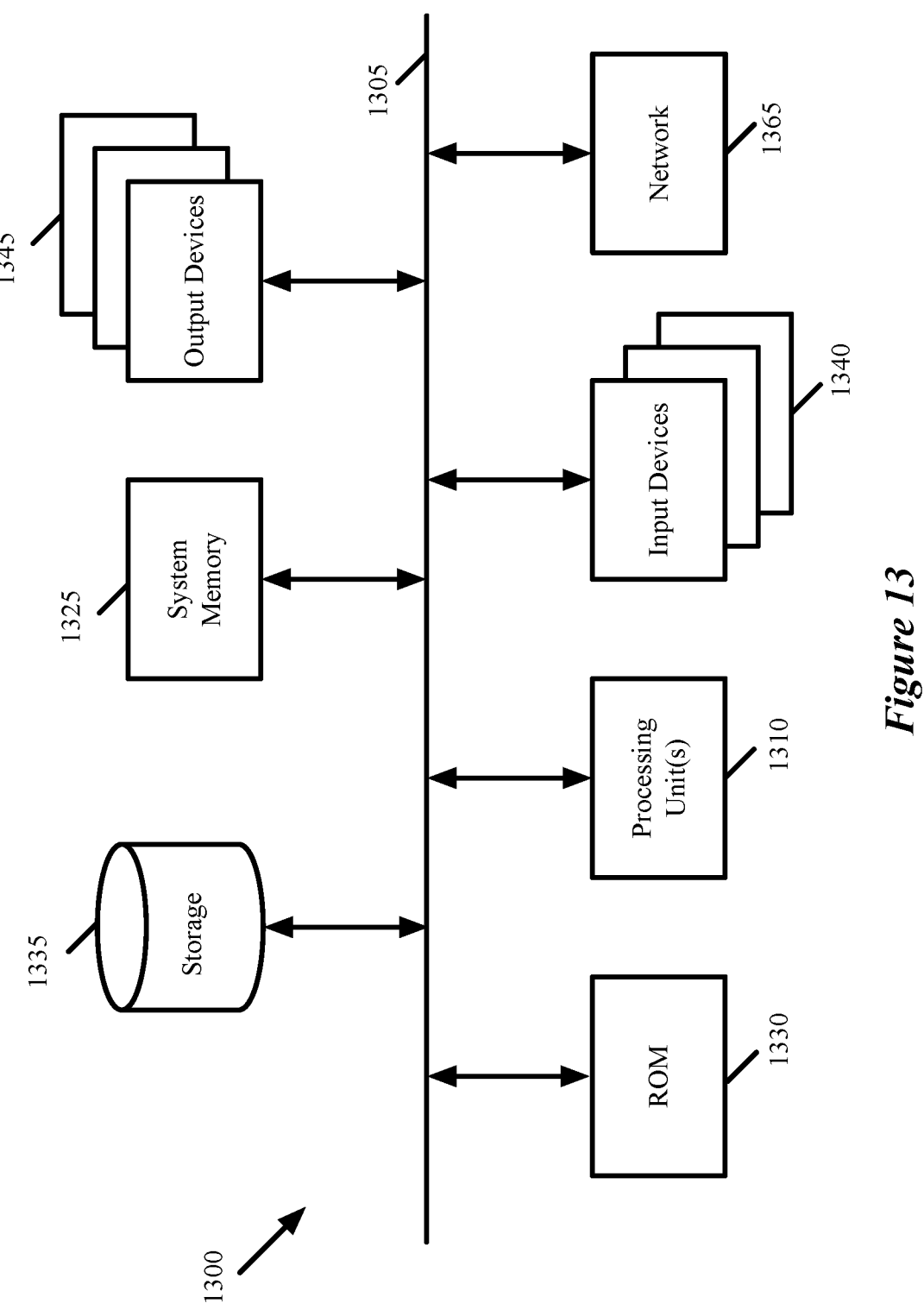
FIG. 13 conceptually illustrates an electronic system with which some embodiments of the invention are implemented.

FIG. 13 conceptually illustrates an electronic system 1300 with which some embodiments of the invention are implemented. The electronic system 1300 can be used to execute any of the applications (e.g., the training application) described above. The electronic system 1300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieves instructions to execute and data to process in order to execute the processes of the invention. The processing unit(s) may be a single processor or a multi-core processor in different embodiments and may include generic CPUs as well as graphics processing units (GPUs).

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such a random-access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieves instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 6 and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for training a first natural language processing (NLP) network based on a previously-trained second NLP network, the method comprising:

propagating a plurality of text inputs through (1) the first NLP network to generate a first set of output vectors and (2) the previously-trained second NLP network to generate a second set of output vectors, each respective output vector of the first set of output vectors generated based on a respective text input having a corresponding output vector of the second set of output vectors generated based on the respective text input, each respective output vector of the first and second sets of output vectors comprising a same number of respective vector components, each respective output vector for use by a post-processor to select a next word to append to a corresponding text input;

determining, by comparing respective components of a first output vector of the first set of output vectors to corresponding components of a first output vector of the second set of output vectors, a set of per-component disparity values between the first output vector of the first set of output vectors and the first output vector of the second set of output vectors, wherein the first output vector of the first set of output vectors and the first output vector of the second set of output vectors are generated using the same text input;

computing a value for a loss function based on a determination of a maximum disparity among the set of per-component disparity values; and training the first NLP network using the computed value for the loss function to minimize the maximum disparity so that the first NLP network produces outputs similar to outputs of the previously-trained second NLP network.

2. The method of claim 1, wherein, after training, the first NLP network operates to generate output vectors based on input text.

3. The method of claim 2, wherein the trained first NLP network:

receives a first text input;

deterministically generates a first output vector; and provides the first output vector to a non-deterministic token selection function that selects a first token based on the first output vector, wherein the first token is appended to the first text input as a second text input and provided as a second text input to the trained first NLP network.

4. The method of claim 3, wherein, until a stopping condition is reached, the trained first NLP network iteratively:

receives a current text input;

deterministically generates an output vector based on the received current text input; and provides the generated output vector to a non-deterministic token selection function that selects a token based on the first output vector, wherein the token is appended to the current text input as a next text input for the trained first NLP network.

5. The method of claim 2, wherein the output vectors represent probability distributions over potential next tokens to append to the input text.

6. The method of claim 1, wherein the loss function nests continuously-differentiable functions that estimate a maximum disparity among maximum disparities identified for each output vector of the first set of output vectors and corresponding output vectors of the second set of output vectors.

7. The method of claim 1, wherein:
each respective text input comprises a respective plurality of time steps;
each of the first and second NLP networks generates a separate output vector for each time step; and
the loss function nests continuously-differentiable functions that estimate a maximum disparity among the maximum disparities identified for each text input, said maximum disparities each corresponding to a respective time step, and (ii) estimate a maximum disparity among the maximum disparities identified for each output vector of the first set of output vectors and corresponding output vectors of the second set of output vectors.

8. The method of claim 1, wherein training the first NLP network to minimize the maximum disparity improves accuracy of the first NLP network for inputs for which the generated first set of output vectors are furthest from expected network outputs.

9. The method of claim 1, wherein the loss function uses a log-sum-exponent formulation to estimate the maximum disparity between the components of the first output vector of the first set of output vectors and the corresponding components of the first output vector of the second set of output vectors.

10. The method of claim 1, wherein the loss function uses a p-norm function to estimate the maximum disparity between the components of the first output vector of the first set of output vectors and the corresponding components of the first output vector of the second set of output vectors.

11. The method of claim 1, wherein the loss function uses a Boltzmann expected energy formulation to estimate the maximum disparity between the components of the first output vector of the first set of output vectors and the corresponding components of the first output vector of the second set of output vectors.

12. The method of claim 1, wherein the first NLP network has a first number of transformer decoders and the second NLP network has a second, larger number of transformer decoders.

13. The method of claim 1, wherein the first NLP network has a first number of parameters and the second NLP network has a second, larger number of parameters.

14. A non-transitory machine-readable medium storing a program which when executed by at least one processing unit trains a first natural language processing (NLP) network based on a previously-trained second NLP network, the program comprising sets of instructions for:
propagating a plurality of text inputs through (1) the first NLP network to generate a first set of output vectors and (2) the previously-trained second NLP network to generate a second set of output vectors, each respective output vector of the first set of output vectors generated based on a respective text input having a corresponding output vector of the second set of output vectors generated based on the respective text input, each respective output vector of the first and second sets of output vectors comprising a same number of respective vector components, each respective output vector for use by a post-processor to select a next word to append to a corresponding text input;
determining, by comparing respective components of a first output vector of the first set of output vectors to corresponding components of a first output vector of the second set of output vectors, a set of per-component disparity values between the first output vector of the first set of output vectors and the first output vector of the second set of output vectors, wherein the first output vector of the first set of output vectors and the first output vector of the second set of output vectors are generated using the same text input;
computing a value for a loss function based on an determination of a maximum disparity among the set of per-component disparity values; and
training the first NLP network using the computed value for the loss function to minimize the maximum disparity so that the first NLP network produces outputs similar to outputs of the previously-trained second NLP network.

15. The non-transitory machine-readable medium of claim 14, wherein, after training, the first NLP network operates to generate output vectors based on input text.

16. The non-transitory machine-readable medium of claim 15, wherein, until a stopping condition is reached, the trained first NLP network iteratively:
receives a current text input;
deterministically generates an output vector based on the received current text input; and
provides the generated output vector to a non-deterministic token selection function that selects a token based on the first output vector, wherein the token is appended to the current text input as a next text input for the trained first NLP network.

17. The non-transitory machine-readable medium of claim 15, wherein the output vectors represent probability distributions over potential next tokens to append to the input text.

18. The non-transitory machine-readable medium of claim 14, wherein the loss function nests continuously-differentiable functions that estimate a maximum disparity among maximum disparities identified for each output vector of the first set of output vectors and corresponding output vectors of the second set of output vectors.

19. The non-transitory machine-readable medium of claim 14, wherein:
each respective text input comprises a respective plurality of time steps;
each of the first and second NLP networks generates a separate output vector for each time step; and
the loss function nests continuously-differentiable functions that estimate a maximum disparity among the maximum disparities identified for each text input, said maximum disparities each corresponding to a respective time step, and (ii) estimate a maximum disparity among the maximum disparities identified for each output vector of the first set of output vectors and corresponding output vectors of the second set of output vectors.

* * * * *